United States Patent
Suginobu et al.

(10) Patent No.: US 7,543,944 B2
(45) Date of Patent: Jun. 9, 2009

(54) PROJECTION-TYPE DISPLAY APPARATUS AND MULTISCREEN DISPLAY APPARATUS

(75) Inventors: Manabu Suginobu, Yokohama (JP); Satoshi Shibuya, Yokohama (JP); Mitsuru Oki, Chigasaki (JP)

(73) Assignee: Hitachi. Ltd., Tokyo (JP)

( * ) Notice: Subject to any disclaimer, the term of this patent is extended or adjusted under 35 U.S.C. 154(b) by 428 days.

(21) Appl. No.: 11/312,763

(22) Filed: Dec. 21, 2005

(65) Prior Publication Data

US 2006/0158516 A1 Jul. 20, 2006

(30) Foreign Application Priority Data

Jan. 20, 2005 (JP) ............................. 2005-012232

(51) Int. Cl.
*G03B 21/20* (2006.01)
(52) U.S. Cl. ........................................... 353/85
(58) Field of Classification Search .................. 353/30, 353/94, 31, 32, 33, 34, 35, 36, 38, 48, 82, 353/89, 90, 91, 92, 93, 69, 70
See application file for complete search history.

(56) References Cited

U.S. PATENT DOCUMENTS

| | | | | |
|---|---|---|---|---|
| 5,805,243 | A * | 9/1998 | Hatano et al. ........................ | 349/5 |
| 6,979,085 | B2 * | 12/2005 | Lurkens et al. ........................ | 353/29 |
| 7,021,772 | B2 * | 4/2006 | Abe et al. ........................ | 353/97 |
| 7,278,745 | B2 * | 10/2007 | Engle ........................ | 353/69 |
| 2002/0085288 | A1 * | 7/2002 | Dewald et al. ........................ | 359/626 |
| 2003/0067587 | A1 * | 4/2003 | Yamasaki et al. ........................ | 353/30 |
| 2004/0021831 | A1 * | 2/2004 | Koide ........................ | 353/31 |
| 2004/0141159 | A1 * | 7/2004 | Abe et al. ........................ | 353/97 |
| 2004/0141161 | A1 * | 7/2004 | Hibi et al. ........................ | 353/99 |
| 2004/0196303 | A1 | 10/2004 | Matsuda | |
| 2005/0052618 | A1 * | 3/2005 | Ulichney et al. ........................ | 353/30 |
| 2005/0162619 | A1 * | 7/2005 | Hamaya ........................ | 353/69 |
| 2006/0050245 | A1 * | 3/2006 | Arai et al. ........................ | 353/85 |

FOREIGN PATENT DOCUMENTS

| | | |
|---|---|---|
| JP | 2-73241 | 3/1990 |
| JP | 2001-117164 | 4/2001 |
| JP | 2003-228046 | 8/2003 |
| JP | 2003-324670 | 11/2003 |
| JP | 2004-62109 | 2/2004 |

\* cited by examiner

*Primary Examiner*—Bao-Luan Le
(74) *Attorney, Agent, or Firm*—Antonelli, Terry, Stout & Kraus, LLP.

(57) ABSTRACT

The projection type display apparatus according to the present invention includes a light source (20), display devices (29, 34, 42) for forming an optical image by demodulating light from the light source in response to a drive voltage, a projection lens (15) for enlarging and projecting the optical image on the display device, a detector (5) for detecting the light from the projection lens, and a control circuit (11) for controlling the drive control in response to an output from the detector. The detector is arranged at a position close to an external periphery of a light flux emitted from the projection lens, and detects a portion of light from the projection lens (diffuse light) reaching outside of an effective area of a screen.

13 Claims, 19 Drawing Sheets

US 7,543,944 B2

PROJECTION-TYPE DISPLAY APPARATUS AND MULTISCREEN DISPLAY APPARATUS

CLAIM OF PRIORITY

The present application claims priority from Japanese application serial no. JP 2005-012232, filed on Jan. 20, 2005, the content of which is hereby incorporated by reference into this application.

BACKGROUND OF THE INVENTION (1) Field of the Invention

The present invention relates to a projection-type display apparatus enlarging and projecting an optical image formed on a display device such as a liquid crystal display and a multiscreen display apparatus using the same.

(2) Description of the Related Art

A conventional projection-type display apparatus generally uses a lamp as a light source, and the brightness is high in the initial stage of use but decreases over the time of use. There are known related arts to compensate the loss of brightness as described, for instance, in Japanese Patent Laid-open No. 2-73241 (document 1) and Japanese Patent Laid-open No. 2001-117164 (document 2).

Document 1 discloses a technique for controlling the brightness so as to be stable on a screen by providing a light detector (hereinafter referred to as "detector") for detecting the brightness (light intensity) in proximity to the screen of the projection-type display apparatus, and by adjusting an amount of input power to be supplied to the light source based on the output of the detection. Document 2 discloses another technique by disposing the detector in the middle of the light path from the light source to the display device. Document 2 further discloses a technique for controlling the brightness so as to be stable on a screen by adjusting an amount of input power to be supplied to the light source based on the output of the detection, as disclosed in document 1.

SUMMARY OF THE INVENTION

According to the technique described in document 1, the detector is disposed in an effective area in proximity to the screen. Therefore, there is a possibility that the brightness of the light from the projection lens cannot be measured precisely due to the effect by the light around the screen (for instance, illumination in the room where the projection-type display apparatus is placed). Further, since the detector is disposed in the effective area in proximity to the screen, a shadow of the detector may affect the image, disabling the detector to be arranged all the time for adjustment.

According to the technique disclosed in document 2, there is no effect by the peripheral light as with document 1, since the detector is disposed in the middle of the light path in the sealed structure from the light source to the display device. However, not only the light source that changes over time, but also other optical components such as a polarization plate and the display device can be deteriorated due to the ultraviolet ray included in the light from the light source. Therefore, according to document 2, though an over-time change of the light source and the optical components disposed on the light path from the light source to the detector is detectable, it is not possible to detect any over-time change of other optical components (especially the display device) disposed on the light path after the detector.

The present invention has been made in view of the above-described situations. The present invention provides a technique capable of compensation and correction of the over-time changes of the optical components such as the light source, display device, polarization plate and the like in the projection-type display apparatus while decreasing effects on the image on the screen or effects by the peripheral light.

The projection-type display apparatus according to the present invention is characterized in that the brightness of the diffuse reflection of the projected light emitted from the projection lens is detected by the detector. The diffuse reflection is detected by, for instance, disposing the detector in proximity to an outer edge of light flux emitted from the projection lens. Since this configuration allows for detecting lights transmitted through or reflected from the display device or polarization plate, the configuration is able to cover all the over-time changes of any optical components including the light source and the projection lens. The diffuse reflection herein refers to the light causing irregular reflection from a surface of the lens or an internal surface of a lens tube as the light transmits through the projection lens to be projected outside the display area of the screen, or the light that does not reach outside the effective area on the screen among the lights emitted from the projection lens. Therefore, the shadow of the detector is not projected on the effective area of the screen and thus the effect on the image given by (the shadow of) the detector can be reduced. If the detector is disposed in proximity to the projection lens with a photo acceptance section thereof facing the projection lens under the above-described condition, the effect by the peripheral light except for the light emitted from the projection lens can be dramatically reduced.

The present invention is capable of compensation and correction of the over-time changes of various optical components as mentioned above while decreasing effects on the image on the screen given by the detector. Such compensation and correction can also be made while decreasing effects by the peripheral light outside the apparatus.

DETAILED DESCRIPTION OF THE PREFERRED EMBODIMENTS

Embodiments of the present invention will be described below with reference to the drawings.

First Embodiment

Figure 1:
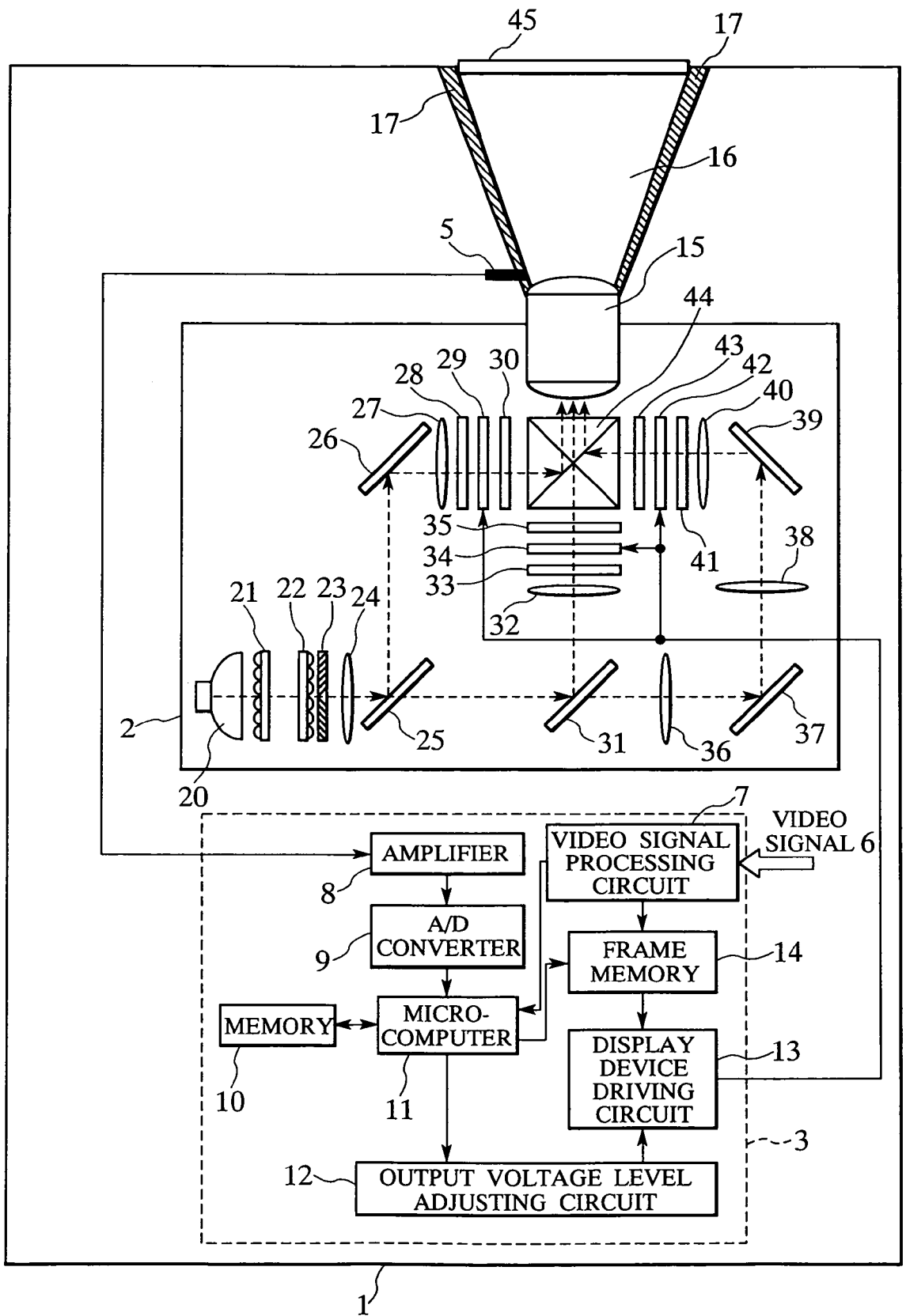
FIG. 1 is a schematic diagram showing a projection-type display apparatus according to a first embodiment.
Figure 2:
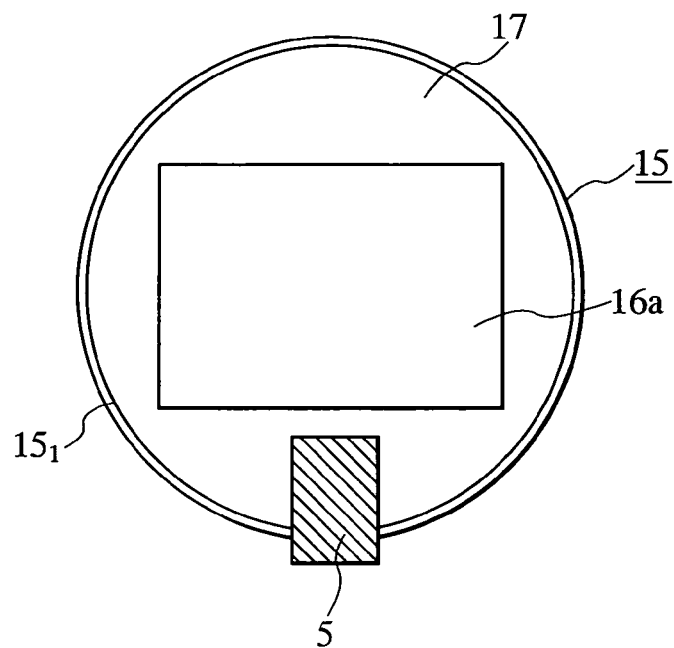
FIG. 2 is an enlarged view of a cross section of a projection lens orthogonal to the optic axis seen from the light-emitting side.
Figure 3:
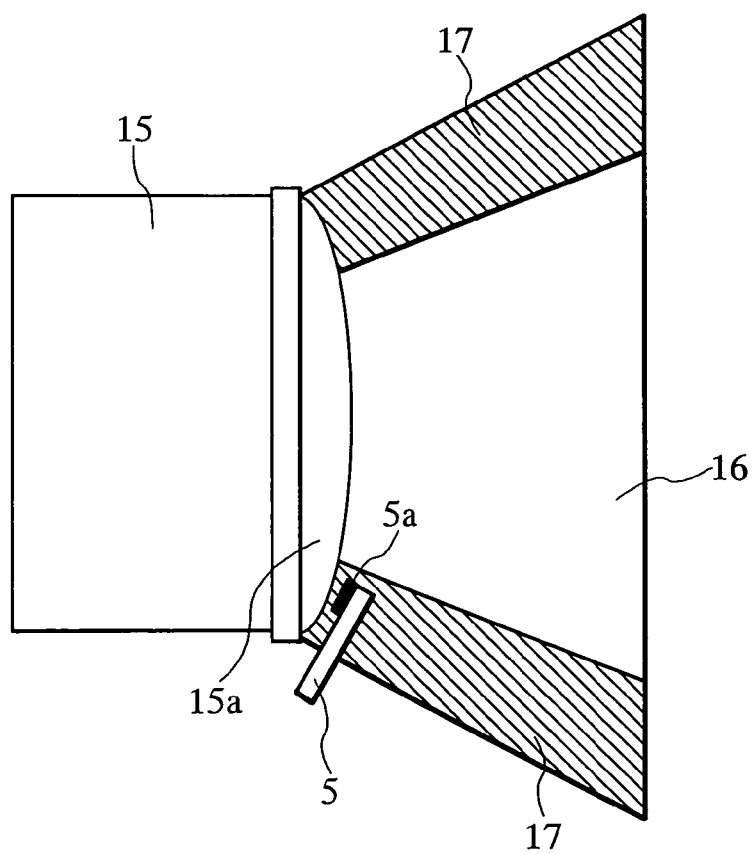
FIG. 3 is an enlarged side view of the projection lens.
Figure 4:
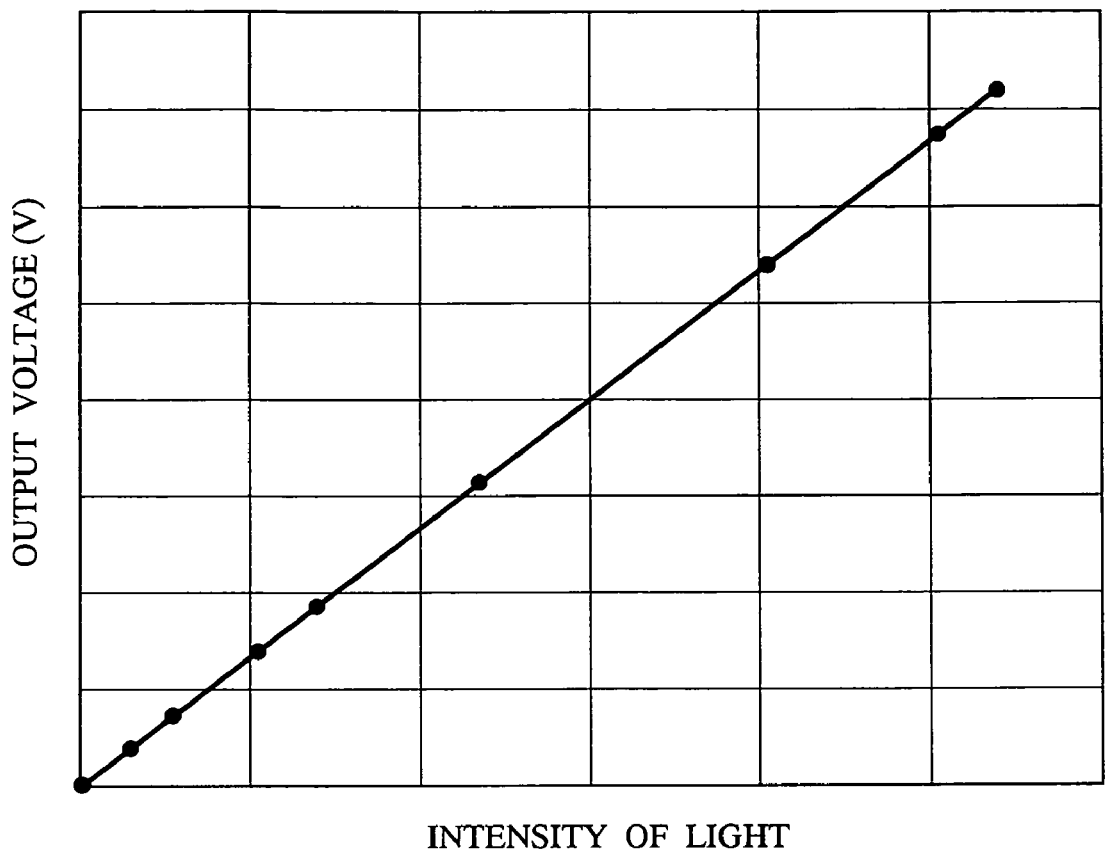
FIG. 4 is a chart showing relation between the image light within the display screen and the diffuse reflection.

FIG. 1 is a view showing the configuration of the projection-type display apparatus according to a first embodiment of the present invention, FIG. 2 is an enlarged view of a cross section of a projection lens orthogonal to the optic axis seen from the light-emitting side, FIG. 3 is an enlarged side view of the projection lens, and FIG. 4 is a graph showing the result of detection of the light intensity of the diffuse reflection using the detector as the light intensity of the image light is changed within the display area.

In FIG. 1, reference numeral 1 denotes a projection-type display apparatus including an optical section 2 and a signal processing section 3. At first, the optical section 2 will be described with reference to FIGS. 1, 2, 3 and 4. In FIG. 1, the light flux emitted from a light source 20 enters a first lens array 21 including a plurality of lens cells (not shown). The light flux entered the first lens array 21 is divided into a plurality of light fluxes by each lens cell to form a secondary light source image in proximity to each of corresponding lens cell (not shown) in a second lens array 22 including a plurality of lens cells (not shown). The second lens array 22 superposes each lens cell image in the first lens array over display devices 29, 34, 42 along with a focal lens 24, condenser lenses 27, 32 and relay lenses 36, 38, 40 to produce an image with an even illumination.

At this time, in the light flux emitted from the second lens array 22, the polarization is aligned by a polarizing beam splitter 23 (for instance, S polarization). Also, the white light emitted from the focal lens 24 is divided for the display devices 29, 34, 42 (transmissive liquid crystal panel herein) corresponding to each color (red, green and blue herein) by the action of dichroic mirrors 25, 31 as a means of color separation and reflecting mirrors 26, 37, 39 deflecting the light path. In order to improve the contrast, incoming-side polarization plates 28, 33, 41 and outgoing-side polarization plates 30, 35, 43 are also provided before and behind the display devices 29, 34, 42 respectively.

The light intensity of color light each having entered the display devices 29, 34, 42, is modulated based on driving signals (voltage) from a display device driving circuit described hereinafter with respect to each display device, and an optical image is formed. The optical image is turned into a color optical image by color composition using a composite prism 44, and the color optical image is enlarged by a projection lens 15 and projected on a screen 45.

The outgoing light (projection light) exiting from the projection lens 15 includes, as shown in FIGS. 2 and 3, an image light 16 forming the optical image on the screen 45, a cross section of whose light flux being a rectangular area (hereinafter also referred to as "display area") 16a similar to the display area (not shown) of the display device, and a diffuse reflection 17 formed around the image light 16. The diffuse reflection 17 is light generated by reflection from a surface of a lens, a surface of a lens tube $15_1$ and the like in the projection lens 15. The diffuse reflection 17 is projected outside an effective (display) area of the screen 45. A detector 5 to detect a brightness (light intensity) is disposed in proximity to an outgoing-side lens 15a of the projection lens 15. The detector 5 is, as obvious from FIG. 3, in order to reduce an effect by the peripheral light, provided with a photo acceptance section 5a thereof in direction of the outgoing-side lens 15a of the projection lens 15, and configured to detect the light intensity of the diffuse reflection (shaded area) 17 appearing around the display area 16a.

FIG. 4 schematically shows an example of the light intensity characteristic of the diffuse reflection detected by the detector 5 when the light intensity of the image light is changed in the image light area. The light intensity characteristic indicates a correlation between the light intensity in the image light area and the diffuse reflection appearing around the area. Namely, the detector 5 is disposed outside the display area to detect the diffuse reflection 17 so as not to affect the image light (for instance, so as not to produce a shadow of the detector 5). In this way, because of the correlation between the detected value and the light intensity of the image light, the transition of the reduced amount of the light intensity (brightness) against the initial value can be detected by comparing the value detected initially by the detector 5 in the beginning of use of the projection-type display apparatus with the detected value after changes over time. As described later, the present embodiment uses proportion of the detected value after changes over time against the initially detected value.

Next, the signal processing section 3 will be described with reference to FIG. 1. According to FIG. 1, the signal processing section 3 includes an image signal processing circuit 7, a frame memory 14, a display device driving circuit 13, and an output voltage level adjusting circuit 12. The image signal processing circuit 7 performs a signal processing required for an inputted image signal. The frame memory 14 records the processed image signal. The display device driving circuit 13 generates driving signals driving each of the display devices 29, 34, 42 based on the image signal outputted from the frame memory 14. The output voltage level adjusts circuit 12 adjusts output voltage corresponding to the maximum grayscale value outputted from the display device driving circuit 13 (for instance, the grayscale value 255 when the image signal is 8 bits). The signal processing section 3 also includes an amplifier 8, an A/D converter circuit 9, a non-volatile memory 10, and a computing control unit (hereinafter referred to as "microcomputer") 11. The amplifier 8 amplifies either current or voltage outputted from the detector 5 detecting the brightness (light intensity) of the light flux. The A/D converter circuit 9 converts the output power from the amplifier 8 into a digital data. The computing control unit (hereinafter referred to as "microcomputer") 11 controls the entire projection-type display apparatus according to a program stored in a ROM not shown in the drawing.

The memory 10 stores a display pattern (bit map pattern) in advance to measure transition of the brightness reduction created by the over-time change of optical components such as the light source, polarization plate, and display device. The memory 10 also stores an initial value as a reference value to the transition of the brightness reduction.

In the normal case of image displaying, an image signal 6 inputted into the signal processing section 3 is subjected to a prespecified signal processing in the image signal processing circuit 7 to be stored in the frame memory 14. The display device driving circuit 13 generates the driving signals driving each of the display devices 29, 34, 42 based on the image signal inputted from the frame memory 14 to drive each display device. This changes the transmittance or reflectivity of each light according to the driving signal voltage, and forms an optical image on each display device with the color light associated with the display device. Since an output voltage Vw (this voltage is hereinafter referred to as "reference output voltage" unless there is any doubt) corresponding to the maximum grayscale value outputted from the display device driving circuit 13 is specified by the output voltage level adjusting circuit 12 at this time, the output voltage of the image signal of a given grayscale value outputted from the display device driving circuit 13 produces an output based on the reference output voltage Vw as a weighting factor. Therefore, the brightness (light intensity) of the optical image formed on the display device may vary depending on the reference output voltage Vw. Namely, the brightness of the optical image formed on the display device can be changed by adjusting the reference output voltage Vw. It should be noted that the brightness increases as the reference output voltage Vw increases.

While the transmittance is normally set to be 100% at Vw, the transmittance is set to be 100% or less at Vw at the start of use (at the time of factory shipment) in the following description so that the brightness reduction caused by the over-time change can be compensated by increasing Vw. However, the present invention is not limited to this condition.

On the other hand, in order to detect the light intensity, the microcomputer 11 reads the prespecified display pattern from the memory 10, writes the prespecified display pattern on the frame memory 14, displays the prespecified display pattern via the display device driving circuit on each display device, and projects the prespecified display pattern on the screen 45. The detector 5 disposed in proximity to the exist side of the projection lens 15 detects the light (diffuse reflection) exited from the projection lens 15 to generate voltage for instance. The voltage is converted into a digital amount by the A/D converter and inputted into the microcomputer 11. The microcomputer 11 stores the inputted measurement data in the memory 10 as an initial value, in the case where the initial value is measured. In the case of adjustment of the brightness reduction due to the effect of the over-time change afterward, in order to reduce the effect of the brightness reduction due to the over-time change, an amount of the change from the initial value (as described later, rate of change herein) is computed. The microcomputer 11 adjusts the reference output voltage of the driving signal outputted from the display device driving circuit 13 to the display device using the output voltage level adjusting circuit 12 based on the amount of the change. The series of processing will be detailed later with reference to a flow chart. It is assumed that the reference output voltage outputted from the display device driving circuit 13 is set at a prespecified output voltage in the output voltage level adjusting circuit 12 at the time starting to use the projection-type display apparatus.

Figure 5:
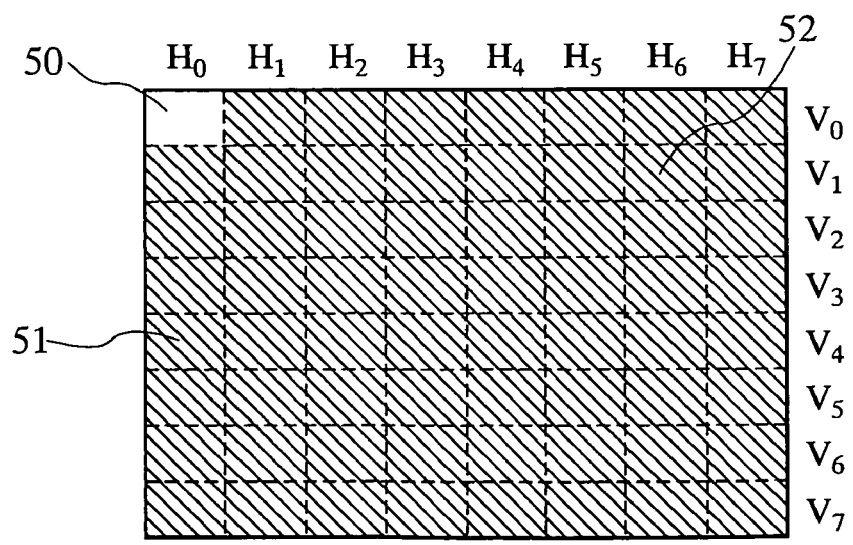
FIG. 5 is an example of display pattern with the first embodiment.

FIG. 5 shows an example of a display pattern (bit map pattern) previously stored in the memory 10 and used to measure the change in the brightness reduction caused by the over-time change. Assuming that the rectangular display area of the display device is divided by 64 into cells (small areas) 54 consisting 8 rows (rows $V_0$ to $V_7$) and 8 columns (columns $H_0$ to $H_7$), as shown in FIG. 5, and the sell (row $H_i$, column $V_j$) is referred to as $H_iV_j$. In this case the memory 10 stores 64 different patterns indicating white (100%) in only one of the cells $H_iV_j$ (i, j: 0 to 7) and indicating black (0%) in other cells. FIG. 5 shows a case where cell $H_0V_0$ is the white display section 50, and other cells are black display sections 51. To display a display pattern, the microcomputer 11 reads one of the display patterns stored in the memory 10 as needed, writes the same on the frame memory 14, and makes the display device display the pattern display. It is assumed that a display pattern indicating white in only cell $H_iV_j$ is hereinafter referred to as $P_{ij}$.

In the meantime, in FIG. 1, the light source 20 represents anything that emits light, which may be, but not limited to, a lamp, LED, or the like. The configuration of the optical section 2 does not have necessarily to be similar to the configuration in FIG. 1 using the polarizing beam splitter, polarization plate, lens, display device and the like. The configuration may be changed as needed according to the display device used.

Figure 6:
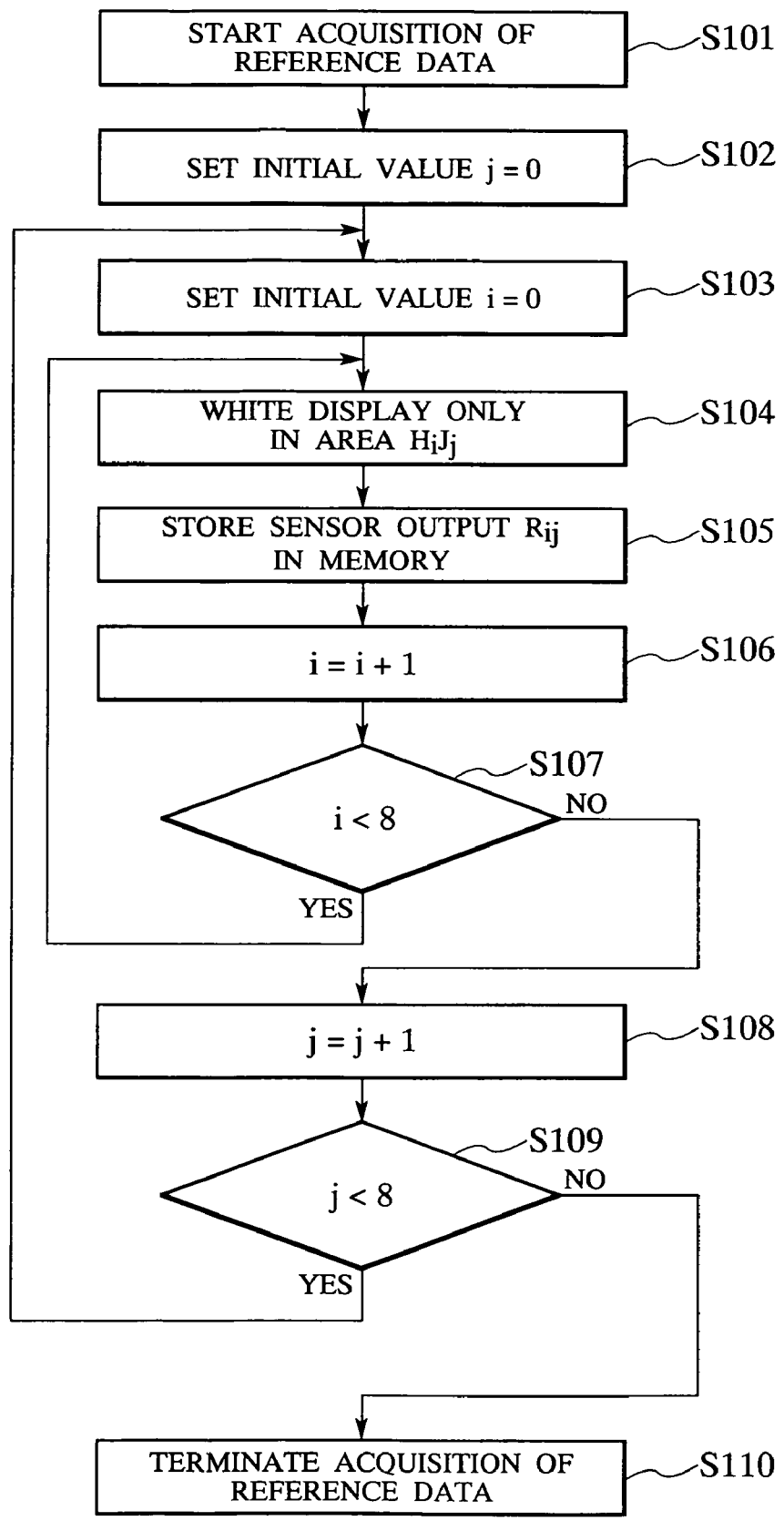
FIG. 6 is a flow chart showing steps to obtain reference data with the first embodiment.

Hereinafter the operations in the adjusting process of the brightness reduction caused by the over-time change with this embodiment will be described with reference to flow charts. At first, a procedure of acquiring the reference data (initial value) will be described. FIG. 6 is a flow chart showing the procedure of acquiring the reference data (initial value).

In FIG. 6, upon start of acquiring the reference data in step (hereinafter abbreviated as "S") 101, it is assumed the initial value j is set to 0 (S102), i is set to 0 (S103), and the processing proceeds to S104. Then, as shown in FIG. 5, the display pattern $P_{ij}$ indicating white in only cell $H_iV_j$ among the display area of the display device divided into 64 cells is read from the memory 10 and written on the frame memory 14. This allows the display pattern $P_{ij}$ to be formed on the display device and projected on the screen 45 by the projection lens 15. Then, the detector 5 disposed in proximity to the outgoing-side lens 15a of the projection lens 15 detects the light intensity of the diffuse reflection 17. The output value $R_{ij}$ detected by the detector 5 at this timing (hereinafter referred to as "sensor output value") is stored in the memory 10 in association with the display pattern $P_{ij}$ (S105). In S106, the current value i is incremented by 1, and in S107, whether the additional value is smaller than 8 indicating the number of the columns in the display area or not is determined. When a result of the determination in S107 is YES indicating the data acquisition has not been completed in row $V_j$, the processing returns to S104 and repeats the steps S104 to S107 until the data acquisition is completed in all the cells $H_iV_j$ (i: 0 to 7) in row $V_j$.

When a result of determination in S107 is NO indicating the data acquisition has been completed in all the cells in row $V_j$, the current value j is incremented by 1 in S108 to acquire data in the next column. Then in S109, whether the additional value is smaller than 8 which is the number of the columns in the display area or not is determined, and when a result of determination is YES indicating that the data acquisition has not been completed in all the rows, the processing returns to S103. The process from S103 to S109 is repeated until the data acquisition is completed in all the rows. When the result in S109 is NO indicating that the data acquisition has been completed in all the rows, namely in all the cells, the process of acquiring the reference data is terminated (S110).

The 64 sets of data ($R_{00}$ to $R_{77}$) acquired through the processing above using only the cell $H_iV_j$ for white display and all other cells for black display are used as reference data.

In this embodiment, a display pattern divided to 64 sections will be described. However, the number of divided sections and other details of the display pattern can be changed according to the necessity for a system or for other purpose. When the number of divided sections increases, an area within the display can be grasped minutely, and the detection time will increase. The present invention is not limited to the number of divided sections of the display described in this embodiment.

Figure 7:
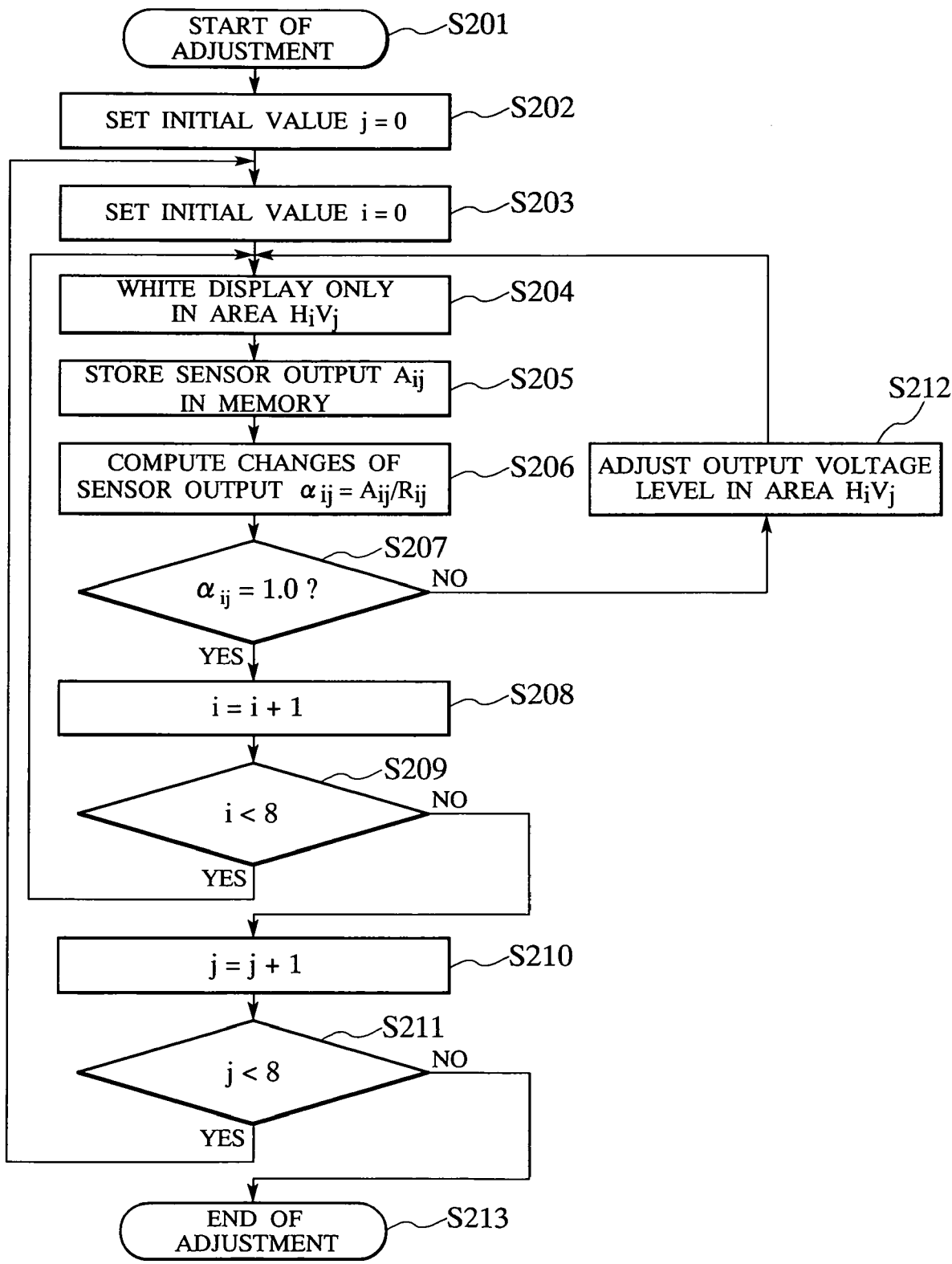
FIG. 7 is a flow chart showing steps of adjustment with the first embodiment.

Operations in the processing for adjusting brightness reduction caused by the over-time change will be described below. FIG. 7 is a flow chart for the procedure for adjusting each of the cells obtained by dividing the display area.

In FIG. 7, when adjustment is started in S201, at first the initial value j is set to zero (S202) and initial value j to 0 (S203), and the processing proceeds to S204. In S204, like in S104 shown in FIG. 6, a display pattern P with only the cell $H_iV_j$ set in white display is outputted and displayed on the projection type display apparatus 1. Then the light intensity of the diffuse reflection 17 obtained from the detector 5 is detected, and the sensor output value $A_{ij}$ from the detector 5 is stored in the memory 10 in association with the display pattern $P_{ij}$ (S205).

In S206, a change rate in brightness reduction caused by the over-time change in the cell $H_iV_j$ is defined with a ratio of $A_{ij}$ to the reference data $R_{ij}$ as the initial value. The microcomputer 11 reads out $R_{ij}$ and $A_{ij}$ from the memory 10 and computes the change rate $\alpha_{ij}=A_{ij}/R_{ij}$. Whether the change rate $\alpha_{ij}$ is 1 or not is determined n S207. When the answer in S207 is NO indicating that the brightness change is large, the processing proceeds to S212. In S212, an output voltage from the display device driving circuit 13 is adjusted by the output voltage level adjusting circuit 12 so that the brightness of the optical image on the display device is made greater. In this state, the loop processing in S204 to S207 and S212 is executed repeatedly until the initial value $\alpha_{ij}$ is set to 1. The white color used on the display pattern is at 100% level. Thus an output level from the display device driving circuit 13 is the reference output voltage associated with the maximum grayscale value. When the initial value $\alpha_{ij}$ is set to 1, the reference output voltage capable of realizing the brightness equal to the initial brightness can be obtained.

When a result of determination in S207 is YES indicating that brightness reduction (change) does not occur in the cell (or because the initial value $\alpha_{ij}$ is set to 1), the output voltage (reference output voltage) from the display device driving circuit 13 is stored in the memory 10 in association with the display pattern $P_{ij}$. The processing proceeds then to S208 with the current value incremented by 1, and whether the additional value is smaller than 8 which is the number of columns in the display area or not is determined in S209. When a result of determination is YES indicating that adjustment in row $V_j$ is not completed yet, the processing returns to S204. The processing steps from S204 to S209 are repeated until adjustment in all cells $H_iV_j$ (i: 0 to 7) in the row $V_j$ is completed.

When a result of determination in S209 is NO indicating that adjustment has been completed for all cells in the row $V_j$, the current value j is incremented by 1 in S210. In S211, whether the additional value is smaller than 8 which is the number of rows in the display area or not is determined. When a result of determination is YES indicating that data acquisition for all rows has not been completed, the processing returns to S203. Then the processing steps from S203 to S211 are repeated until data acquisition is completed for all rows. When a result of determination is NO indicating that adjustment has been completed in all rows, namely in all cells, the processing for adjustment is terminated (S213).

With the operations as described above, the output voltages (reference output voltages) from the display device driving circuit 13 corresponding to all of the divided cells $H_iV_j$ are stored in the memory 10. Subsequently, the brightness in the display area can be set to the initial brightness based on the reference output voltages $Vmax_{ij}$ (I, j: 0 to 7).

As described above, in this embodiment, even when brightness reduction (brightness change) occurs due to the over-time change of any optical component, adjustment is possible to prevent brightness reduction (brightness change). Because a detector is set at a position adjacent to a lens in the exit side of the projection lens, influence of the over-time change not only in the light source but also in optical components provided in a light path from the light source up to the projection lens can be accommodated. Furthermore, because a light-receiving section of the detector is oriented toward a lens in the exit side of the projection lens, influence by the peripheral light can be reduced. Moreover, because the detector is arranged in the diffuse reflection area and brightness detection is performed with the diffuse reflection, such side effects as projection of a shadow of the detector on a screen never occurs. The light intensity is detected by using divided display patterns, the optical image can partially be detected, which enables also reduction of unevenness in the brightness.

It is assumed in the descriptions above that the initial value $\alpha_{ij}$ for determination in S207 shown in FIG. 7 is set to one ($\alpha_{ij}=1$). The present invention is not limited to this case, however, and it is needless to say that the initial value $\alpha_{ij}$ can be a value within a specific area around 1 as the center. The white level of the display pattern is set to 100%, but the present invention is not limited to this case because adjustment in this embodiment is performed such that a change rate is equalized. The white level can be set, for instance, to 80%.

Second Embodiment

In the first embodiment, it is assumed for readers to understand easily that brightness reduced by the over-time change can be recovered (corrected) to the original level. However, when the brightness decreases substantially, sometimes the correction may be impossible. In the second embodiment described above, this problem is taken into consideration. Block configuration in the second embodiment is the same as that in the first embodiment, and therefore details of the configuration are not described.

Figure 8:
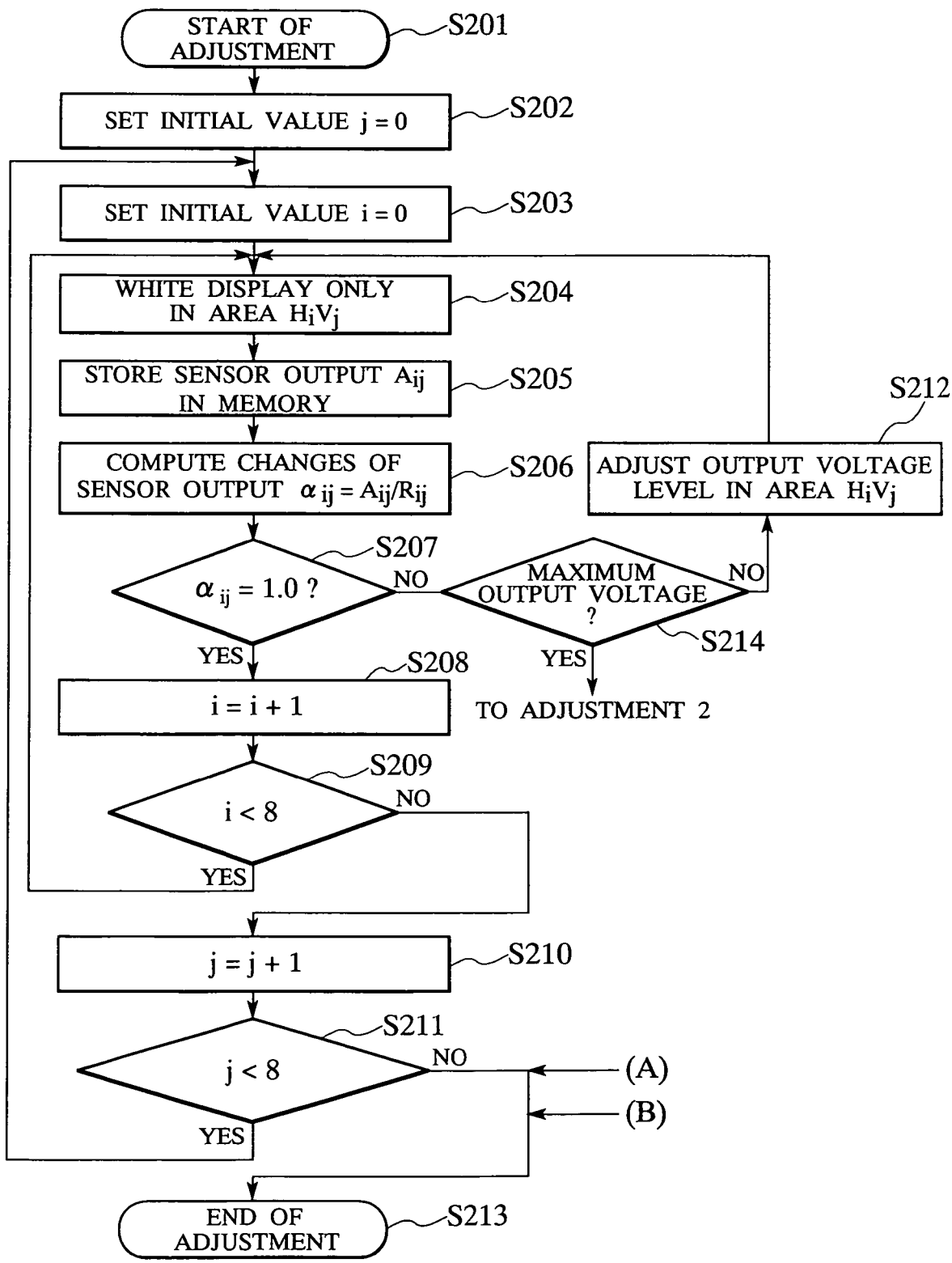
FIG. 8 is a flow chart showing steps of adjustment with a second embodiment.
Figure 9:
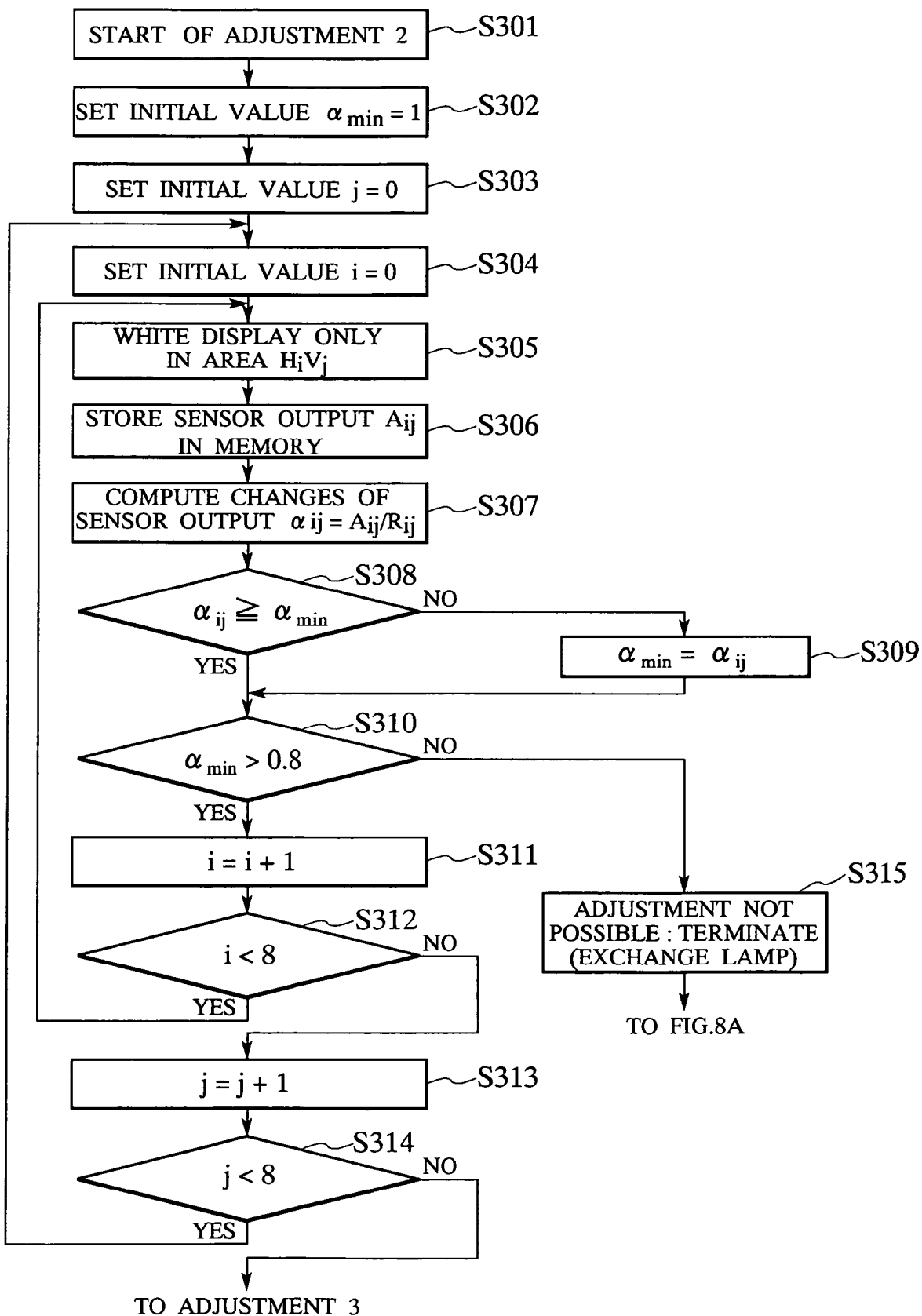
FIG. 9 is a flow chart showing steps of adjustment 2 with the second embodiment.
Figure 10:
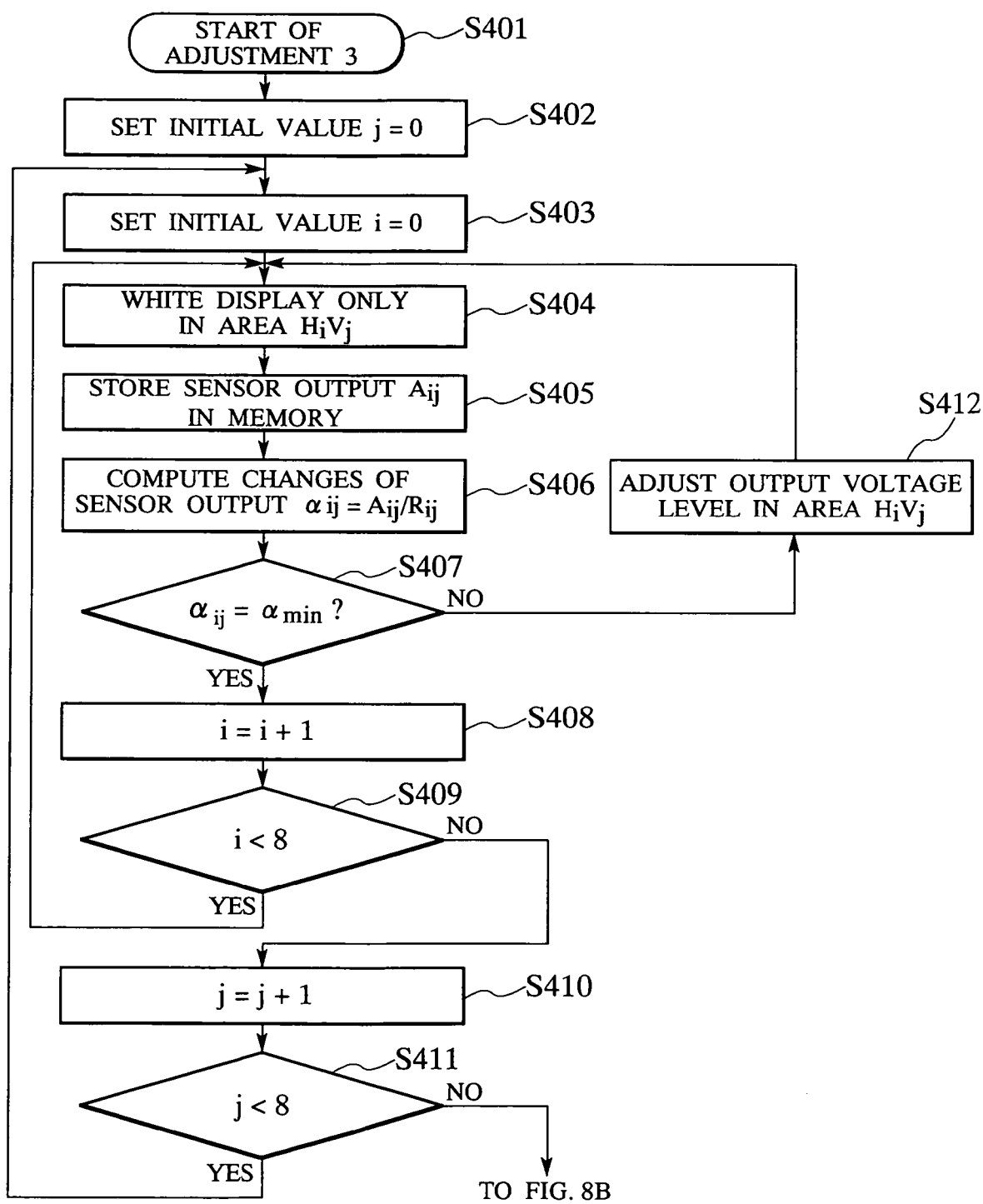
FIG. 10 is a flow chart showing steps of adjustment 3 with the second embodiment.

FIG. 8, FIG. 9, and FIG. 10 are flow charts illustrating an adjustment procedure in the second embodiment.

In the second embodiment, a determination processing step S214 is added to FIG. 7 illustrating the first embodiment. Processing steps S201 to S212 which are the same as those in the first embodiment, the description is omitted, and processing steps S214 and on will be described below.

Referring to FIG. 8, in S214, whether an output voltage from the display device driving circuit 13 in an object cell $H_iV_j$ is maximum or not is determined. The maximum output voltage as used herein is a voltage when a transmission factor of light in a display device (i.e., transmission type liquid crystal panel) is 100%. When the output voltage is not maximum, an output voltage from the display device driving circuit 13 can be raised and then the processing proceeds to S212, where the output voltage is adjusted. When the output voltage is maximum, adjustment can not be performed, and therefore the processing proceeds to S301 in FIG. 9 to start the adjustment 2.

In adjustment 2, a cell with the largest change rate or with the smallest change rate $\alpha_{ij}=A_{ij}/R_{ij}$ (darkest) among the 64 cells is computed.

In FIG. 9, when the adjustment 2 is started, the initial value $\alpha_{min}$ is set to 1 (S302), the initial value j to 0 (S303), and initial value i to 0 (S304). Then the display pattern $P_{ij}$ with only the cell $H_iV_j$ set in white is outputted and displayed on the projection type display apparatus 1 (S305). In the next step, intensity of the diffuse reflection 17 obtained from the detector 5 is detected, and the sensor output value $A_{ij}$ from the sensor 5 is stored in the memory 10 (S306). In S307, the values $R_{ij}$ and $A_{ij}$ are read out from the memory 10 to compute the change rate $\alpha_{ij}=A_{ij}/R_{ij}$, and whether $\alpha_{ij} \leq \alpha_{min}$ or not is determined. When a result of determination in S308 is NO, $\alpha_{min}$ is equalized to $\alpha_{ij}$ and the processing proceeds to S310. When a result of determination is YES, the processing immediately proceeds to S310. In S310, whether $\alpha_{min}$ is larger than the change rate (i.e., for instance, 0.8) at which replacement of the light source 20 is required because the light is too dark or not, is determined.

When a result of determination in S310 is NO, an alarm indicating, for instance, that the light source 20 is to be replaced with a new one (i.e., display of "lamp exchange") is provided for alerting the necessity of exchange of the light source. The processing then proceeds to S213 and the adjustment processing is terminated.

When a result of determination is YES, the processing proceeds to S311 with the current value i incremented by 1. In S312, whether the additional value is smaller than 8 which is the number of columns in the display area or not is determined. When a result of determination in S312 is YES, adjustment in the row $V_j$ has not been completed and the processing returns to S305. Subsequently, the processing steps S305 to S312 are repeated until data acquisition for all of the cells $H_iV_j$ (i: 0 to 7) in the row $V_j$ is completed. When a result of determination in S312 is NO, adjustment for all of the cells in the row $V_j$ has been completed. Then, the current value j is incremented by 1 in S313 for adjustment of the next row. In S314, whether the additional value is smaller than 8 which is the number of rows in the display area or not is determined, and when a result of determination is YES, data acquisition has not been completed for all the rows and the processing returns to S304. Subsequently, the processing steps S304 to S314 are repeated until data acquisition has been complete for all of the rows. When a result of determination in S314 is NO, a target value of $\alpha_{min}$ indicating that adjustment for all of the rows, namely all the cells have been completed is computed. The processing proceeds then to S401 in adjustment 3 shown in FIG. 10, and the adjustment 3 is started.

The adjustment 3 is a process for setting a change rate in the 64 cells to the $\alpha_{min}$ computed in the adjustment 2.

In FIG. 10, when the adjustment 3 is started, at first the initial value j is set to zero (S402) and the initial value i to zero (S403). Then the display pattern $P_{ij}$ with only the cell $H_iV_j$ set in white is outputted and displayed on the projection type display apparatus 1 (S404). Then intensity of the diffuse reflection 17 obtained from the detector 5 is detected, and the sensor output value A from the detector 5 is stored in the memory 10 (S405). In S406, the change rate $\alpha_{ij}=A_{ij}/R_{ij}$ is computed, and whether a is equal to $\alpha_{min}$ or not is determined in S407. When a result of determination is NO, the processing proceeds to S412, and an output voltage from the display device driving circuit 13 is adjusted in the output voltage level adjusting circuit 12. Then the loop processing steps from S404 to S407-S412 are repeated until the change rate a is equalized to $\alpha_{min}$.

When a result of determination in S407 is YES, the output voltage (reference output voltage) from the display device driving circuit 13 is stored in the memory 10 in association with the cell $H_iV_j$. For all of the cells $H_iV_j$ (i: 0 to 7, j: 0 to 7), the processing for setting the change rate $\alpha_{ij}$ to $\alpha_{min}$ is executed with the values I and j changed (S408 to S411). When the setting processing for all the cells (adjustment 3) is completed, the processing proceeds to S213, and the adjustment processing is terminated.

As described above, the second embodiment provides the following effects in addition to those provided in the first embodiment. When the brightness reduced by the over-time change can not be returned (can not be corrected) to the original level, by adjusting so that the change rate of brightness (light intensity) in each cell is equalized, it is possible to eliminate unevenness in brightness and to reduce a change of an image caused by the over-time change. When a change of brightness (light intensity) is large and the change rate (ratio) is small, the necessity of exchanging the lamp is alerted. Thus the maintenance is facilitated.

In the second embodiment, a method of uniformly adjusting the display area by setting the target change rate to $\alpha_{min}$ has been explained. However, the value $\alpha_{min}$ is adjusted according to an object, and the value $\alpha_{min}$ is not always limited to $\alpha_{min}=0.8$ When a result of determination in S214 shown in FIG. 8 is YES, the necessity of exchange of the lamp is displayed. In this case the adjustment processing can immediately be changed.

In S315 shown in FIG. 9, the necessity of "lamp exchange" is displayed and thereby the adjustment processing is immediately terminated, but the present invention is not limited to the configuration. For instance the configuration is possible in which the necessity of exchanging any display devices or optical components in which brightness reduction occurs due to the over-time change is alerted and the adjustment processing is terminated.

Third Embodiment

A third embodiment of the present invention will be described below. In the first embodiment, a rectangular display area of a display device is divided to 64 cells in 8 rows and 8 columns as shown in FIG. 5, but in the third embodiment, the number of divided sections is reduced to enable high speed and easy adjustment. The block configuration in the third embodiment is the same as that in the first embodiment, and details of the configuration are not described here.

Figure 11:
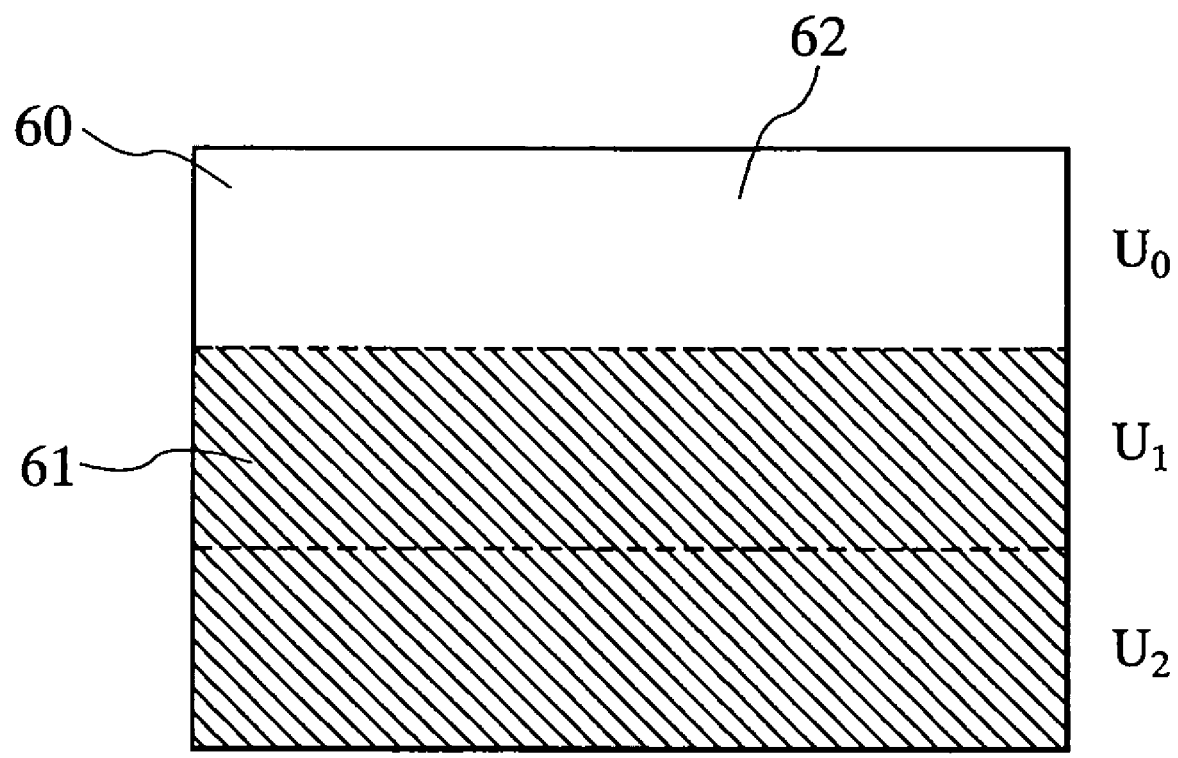
FIG. 11 is an example of display pattern with a third embodiment.

FIG. 11 illustrates an example of a display pattern (bit map pattern) previously stored in the memory 10 and used when change in brightness reduction caused by the over-time change is measured. As shown in FIG. 11, a rectangular display area of the display device is divided to small areas (cells) 62 in three rows (U0 to U2). When each cell is indicated by $U_i$, three display patterns with only the cells $U_i$ (i: 0 to 2) displayed with white and other cells displayed with black (0%) are stored in the memory 10. In FIG. 11, the cell $U_0$ is a white display section 60, and other cells $U_1$, $U_2$ are black display sections 61.

Figure 12:
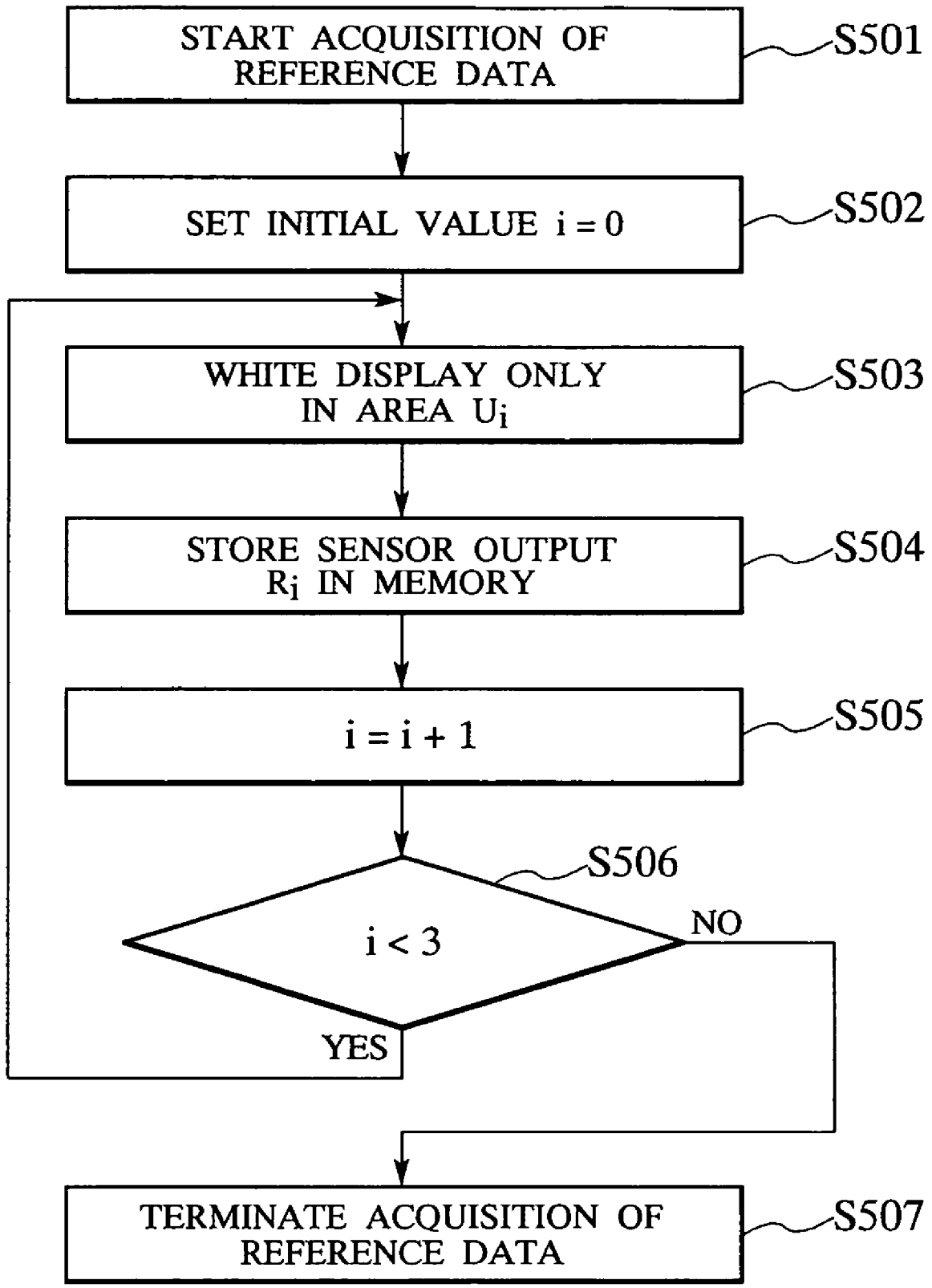
FIG. 12 is a flow chart showing steps to obtain reference data with the third embodiment.

Operations in the third embodiment will be described below. FIG. 12 is a flow chart illustrating a procedure for acquiring the reference data.

In FIG. 12, when acquisition of reference data is started in S501, at first the initial value i is set to zero (S502), and the processing proceeds to S503. In S503, as shown in FIG. 11, the display pattern Pi with only the cell $U_i$ displayed white is outputted and displayed on the projection type display apparatus 1. Then intensity of the diffuse reflection 17 obtained from the detector 5 is detected, and the sensor output $R_i$, which is a detected output value from the detector 5, is stored in the memory 10 (S504). As described above, the reference data using the display pattern $P_0$ can be acquired. In S505 and S506, the initial value i is set to 1 and the initial value i to 2, and the reference data using the display patterns $P_1$, $P_2$ are acquired, and then the processing for acquiring the reference data is terminated (S507).

The three sets of data ($R_0$ to $R_2$) obtained through the processing above, namely the data with only the cell $V_i$ displayed white and all other cells displayed black are used as reference data.

As described above, a display pattern is divided to three sections, but the present invention is not limited to the configuration, and it is needless to say that the configuration can be changed according to the necessity.

Figure 13:
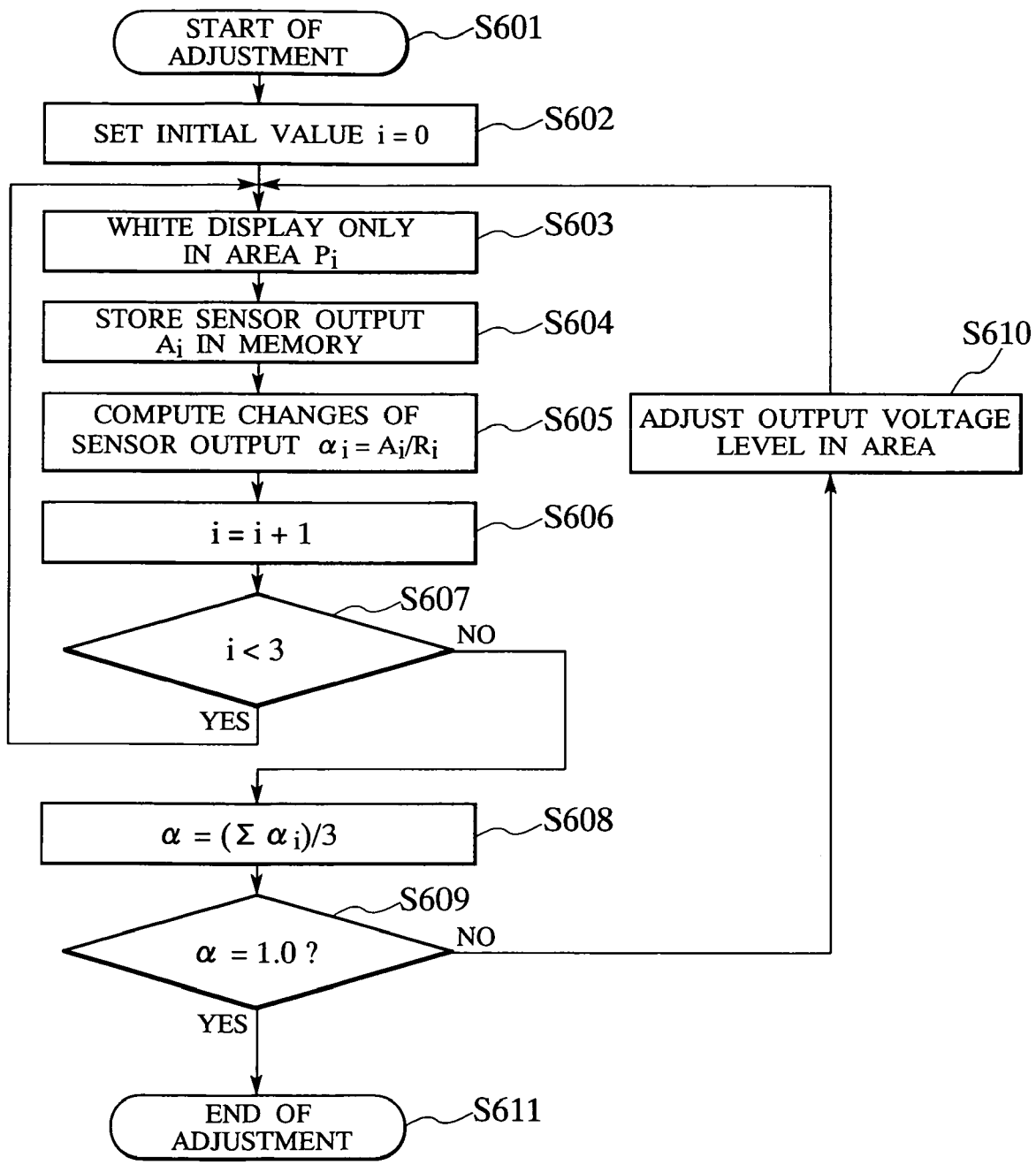
FIG. 13 is a flow chart showing steps of adjustment with the third embodiment.

Operations in the processing for adjusting brightness reduction caused by the time-over change will be described below. FIG. 13 is a flow chart illustrating the adjustment procedure.

In FIG. 13, when adjustment is started in S601, at first the initial value i is set to zero (S602), and the processing proceeds to S603. In S603, the display pattern Pi with only the cell $U_i$ displayed white is outputted, and displayed on the projection type display apparatus 1. Then the diffuse reflection 17 obtained from the detector 5 is detected, and the sensor output value $A_i$ from the detector 5 is stored in the memory 10 (S604).

In S605, the values $R_i$ and $A_i$ are read out from the memory 10, and the change rate $\alpha_i = A_i/R_i$ is computed. In S606, the current value i is incremented by 1, and whether the additional value is smaller than 3 which is the number of rows in the display area or not is determined in S607. When a result of determination in S607 is YES indicating that measurement for all rows has not been completed, the processing returns to S603. The processing steps S603 to S607 are repeated until data acquisition for all rows is completed.

When a result of determination in S607 is NO indicating that measurement for all rows, namely for all cells has been completed, an average change rate $\alpha = \Sigma \alpha_i/3$ on the display screen is computed. In S609, whether the average change rate $\alpha$ is 1.0 or not is determined, and when a result of determination is NO, the processing proceeds to S610. In the entire display area, the output voltage from the display device driving circuit 13 is adjusted by the output voltage level adjusting circuit 12 through a prespecified voltage step so that the average change rate $\alpha$ is set to 1.0. The loop processing in S603 to S609-S610 is repeated until the average change rate $\alpha$ is adjusted to 1.

When the average change rate $\alpha$ is adjusted to 1.0, the adjustment processing is terminated (S611).

With the operations described above, it is possible to easily reduce change of brightness in the entire image caused by the over-time change without a short period of time while achieving the same effects as those attained in the first embodiment.

In S609 shown in FIG. 13, the initial value a is adjusted to 1.0, but the present invention is not limited to this configuration, and it is needless to say that the average change rate $\alpha$ can be set to a value within a prespecified range around 1 as the center.

In the third embodiment, the output voltage from the display device driving circuit 13 in the entire display area is adjusted by the output voltage level adjusting circuit 12 so that the average change rate $\alpha$ is adjusted to 1.0. However, the present invention is not limited to this configuration. For instance, the configuration is possible in which a light source control unit (not shown) for controlling brightness of the light source 20 is provided to raise brightness of the light source 20 so that the average change rate $\alpha$ is adjusted to 1.0. When brightness of the light source 20 is adjusted by the light source control unit, brightness in the entire display area can easily be raised homogeneously.

Fourth Embodiment

Figure 14:
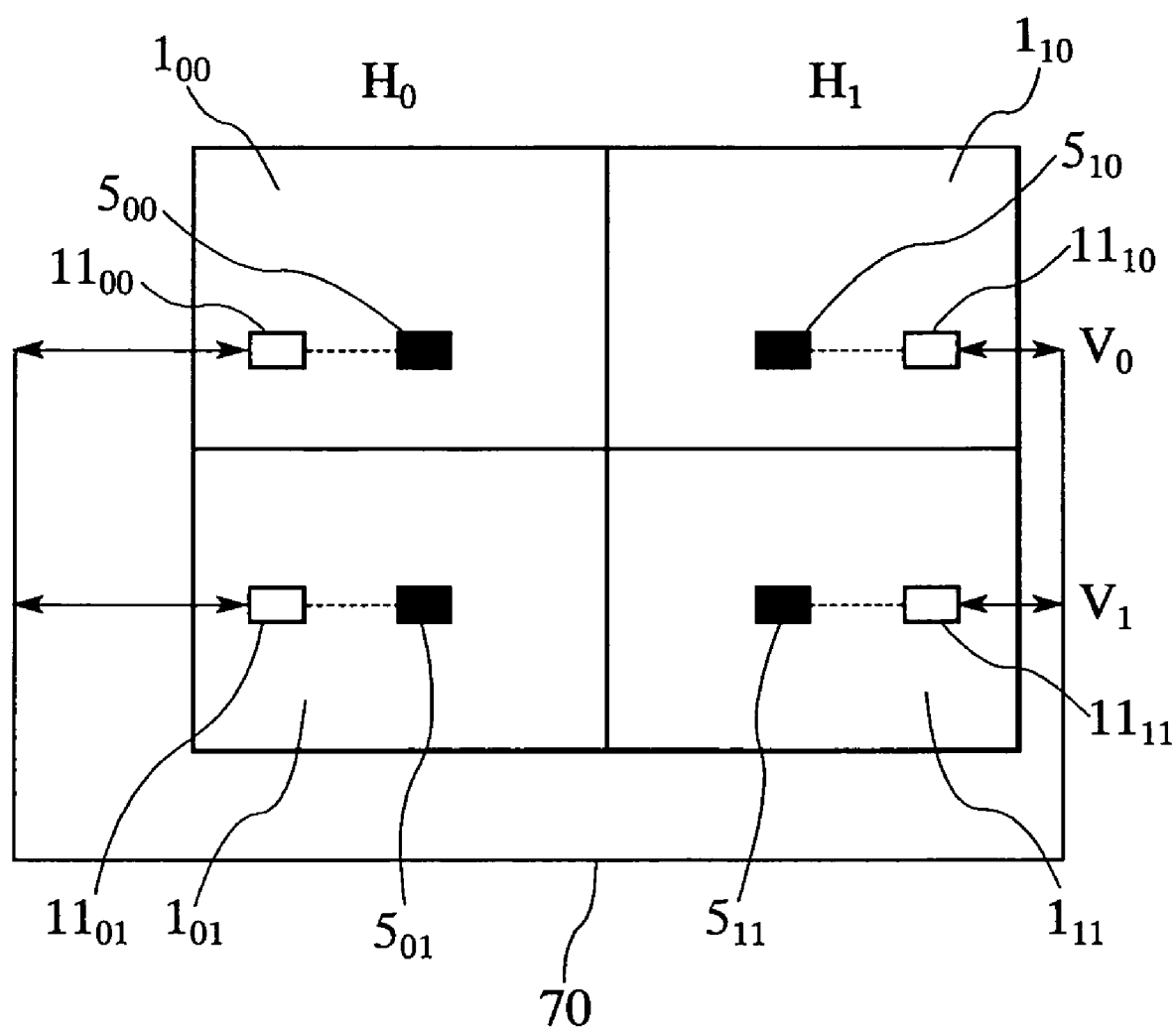
FIG. 14 is a schematic diagram showing a multiscreen display apparatus with a fourth embodiment.
Figure 15:
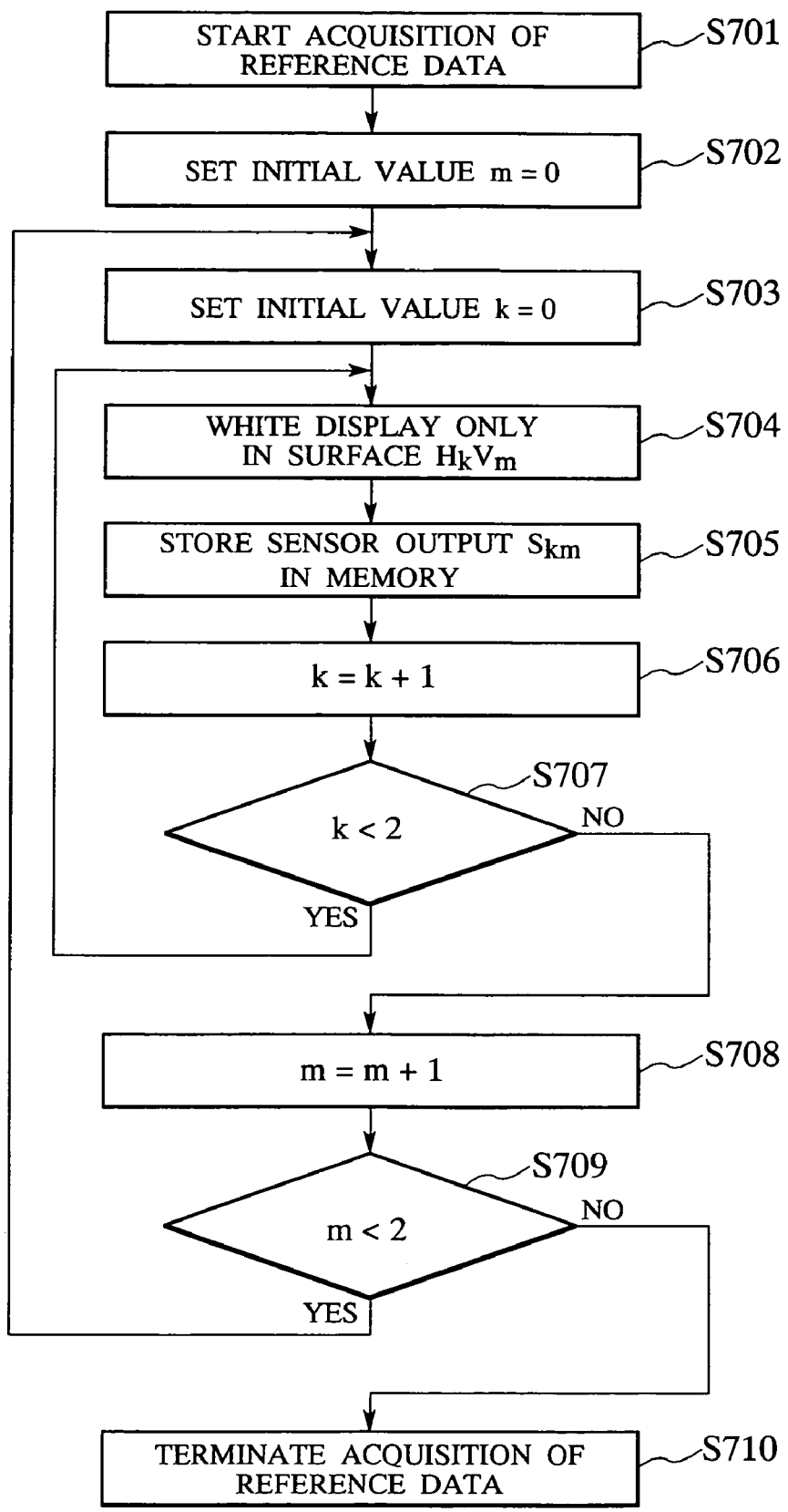
FIG. 15 is a flow chart showing a process of obtaining reference data with the fourth embodiment.
Figure 16:
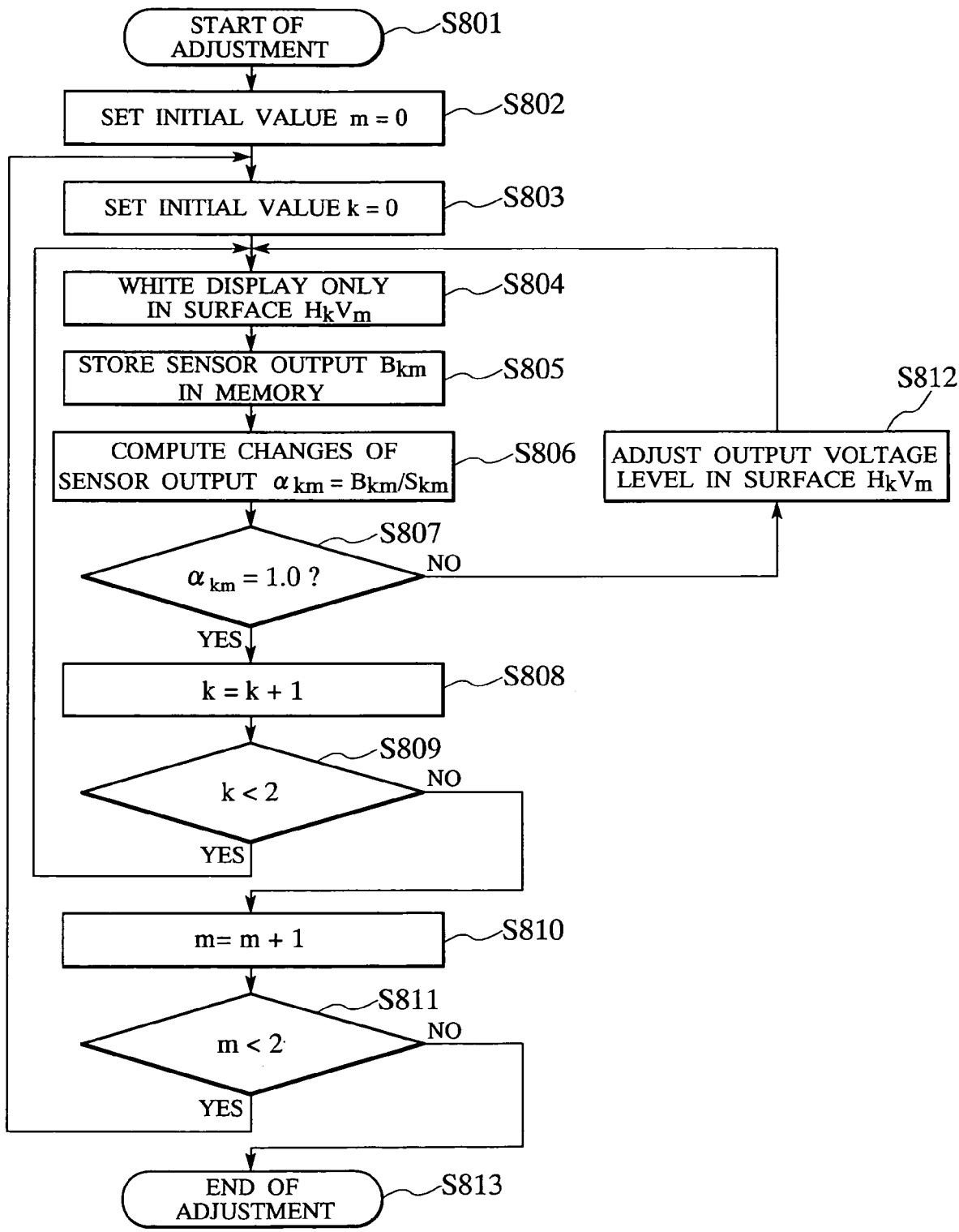
FIG. 16 is a flow chart showing steps of adjustment with the fourth embodiment.

The present invention can be applied also to the so-called multiscreen display apparatus including a plurality of projection type display apparatuses. A fourth embodiment in which the present invention is applied to a multiscreen display apparatus will be described below. FIG. 14 is a block diagram schematically showing a multiscreen display apparatus according to the fourth embodiment; FIG. 15 is a view illustrating the processing for acquiring reference data according to the fourth embodiment; and FIG. 16 illustrates the adjustment processing according to the fourth embodiment.

In FIG. 14, the multiscreen display apparatus includes, for instance, four units of projection type display apparatuses shown in FIG. 1, which are arranged in two columns ($H_0$, $H_1$) and two rows ($V_0$, $V_1$). For convenience of description, a projection type display apparatus at a cross point of a column and a row is denoted with the sign $_{km}$, the display surface thereof with the sign $H_k V_m$, and a detector provided in the projection type display apparatus $_{km}$ with the sign $5_{km}$. Of the four projection type display apparatuses, the master device for controlling the entire multiscreen display apparatus is, for instance, the projection type display apparatus $1_{00}$, and other projection type display apparatuses $1_{10}$, $1_{01}$, and $1_{11}$ are slave devices. Therefore the mutliscreen apparatus is controlled by a microcomputer $11_{00}$ of the projection type display apparatus $1_{00}$. Configuration of each projection type display apparatus $1_{km}$ is the same as that shown in FIG. 1, and description of the details is omitted. When any component of each projection type display apparatus $1_{km}$ will be described, the suffix of km is attached to a sign for the component.

At first, the processing for acquiring reference data will be described with reference to FIG. 15, and then the adjustment processing will be described with reference to FIG. 16. In the fourth embodiment, the adjustment algorithm used in the third embodiment is used for each of the projection type display apparatuses constituting the multiscreen display apparatus, but the present invention is not limited to this configuration.

In FIG. 15, when acquisition of reference data is started in S701, the microcomputer $11_{00}$ of the projection type display apparatus $1_{00}$ as the master device at first sets the initial value m to zero (step S702) and the initial value k to zero (S703). Then the processing proceeds to S704, and the microcomputer 1100 issues an instruction for data acquisition to the microcomputer $11_{km}$ of the projection type display apparatus $1_{km}$ (display surface $H_k V_m$). The microcomputer $11_{km}$ having received the instruction provides white display according to the algorithm for acquiring the reference data in the third embodiment. Then the intensity of the diffuse reflection $17_{km}$ is detected by the detector $5_{km}$, and then the sensor output value $S_{km}$ is stored in the memory $10_{km}$ (S705). Then the microcomputer $11_{km}$ reports to the microcomputer $11_{00}$ of the master device that the data has been acquired. The microcomputer $11_{00}$ of the master device increments the current value K by 1 in S706, and determines in S706 whether the additional value is smaller than 2 indicating the number of columns in the projection type display apparatus constituting the multiscreen display apparatus or not. When a result of determination in S707 is YES indicating that data acquisition for the row $V_m$ has not been completed, the processing returns to S104. Then the processing steps S704 to S707 are repeated until data acquisition for the row $V_m$ is completed in all of the projection type display apparatus $1_{km}$ (k: 0, 1).

When a result of determination in S707 is NO, data acquisition for the row $V_m$ has been completed in all of the projection type display apparatuses, and the current value m is incremented by 1 in S708 for executing data acquisition for the next row. In S709, whether the additional value is smaller than 2 as the number of rows or not, and when a result of determination is YES indicating that data acquisition for all rows has not been completed, the processing returns to S703. Then the processing steps from S703 to S709 are repeated until data acquisition for all rows is completed. When a result of determination in S709 is NO indicating that data acquisition for all rows has been completed in all of the projection type display apparatuses, the processing for acquiring reference data is terminated (S710).

The adjustment as described above can be executed based on the reference data obtained in the processing described above.

The adjustment processing will be described below with reference to FIG. 16. In FIG. 16, when adjustment is started in S801, the microcomputer $11_{00}$ of the projection type display apparatus $1_{00}$ in the master device at first sets the initial value m to zero (S802) and the initial value k to zero (S803). Then the processing proceeds to S804, and the microcomputer $11_{00}$ issues an instruction for adjustment after the over-time change to the microcomputer $11_{km}$ of the projection type display apparatus $1_{km}$ (display surface $H_k V_m$). The instructed microcomputer $11_{km}$ provides white display according to the algorithm for adjustment in the third embodiment. Then the intensity of the diffuse reflection $17_{km}$ obtained from the detector $5_{km}$ is detected, and the sensor output value $B_{km}$ is stored in the memory $10_{km}$ (S805).

In S806, the microcomputer $11_{km}$ reads out $S_{km}$ and $B_{km}$ from the memory $10_{km}$, and the change rate $\alpha_{km} = B_{km}/S_{km}$ is computed. Next, whether the change rate $\alpha_{km}$ is 1.0 or not is determined in S807. When a result of determination in S807 is NO, the processing proceeds to S812, and an output voltage from the display device driving circuit $13_{km}$ is adjusted by the output voltage level adjusting circuit $12_{km}$ so that the change rate $\alpha_{km}$ is adjusted to 1.0. Then the loop processing in S804 to S807-S802 is repeated to adjust the change rate $\alpha_{km}$ to 1.

When a result of determination in S807 is YES indicating that adjustment for the projection type display apparatus has been completed, the fact is reported to the microcomputer $11_{00}$. The microcomputer $11_{00}$ of the master device increments the current value K by 1 in S808, and determines in S809 whether the additional value is smaller than 2 as the number of columns or not. When a result of determination in S809 is YES indicating that adjustment for the row $V_m$ has not been completed, the processing returns to S804, and then the processing steps S804 to S809 are repeated until adjustment for the row $V_m$ has been completed in all of the projection type display apparatus $1_{km}$ (k: 0, 1).

When a result of determination in S809 is NO indicating that adjustment for the row $V_m$ has been completed in all of the projection type display apparatuses, the current value m is incremented by 1 in S810 for executing adjustment for the next row. Whether the additional value is smaller 2 than which is the number of rows or not is determined in S811, and when a result of determination in S811 is YES indicating that adjustment in the projection type display apparatus has not been completed for all rows, the processing returns to S803. Then the processing steps S803 to S811 are repeated until adjustment for all of the rows is completed in the projection type display apparatus. When a result of determination in S811 is NO indicating that adjustment for all rows in all projection type display apparatuses has been completed, the adjustment processing is terminated (S813).

As described above, in this fourth embodiment, brightness reduction caused by the over-time change in each projection type display apparatus constituting the multiscreen display apparatus can be reduced. Furthermore, unevenness in brightness among the projection type display apparatuses due to brightness reduction caused by the over-time change can be reduced.

In the description above, it is assumed that the multiscreen display apparatus has four projection type display apparatuses, but in the present invention, there is no limit over the number of projection type display apparatuses. Furthermore, adjustment is performed for each discrete projection type display apparatus, it is not necessary to sequentially acquire the reference data for adjustment like in the case of the algorithm as described above, and adjustment for all projection type display apparatuses can be executed all at once.

In the fourth embodiment, although the multiscreen display apparatus includes a projection type display apparatus $1_{00}$ as a master device, and other projection type display apparatuses $1_{10}$, $1_{01}$, and $1_{11}$ as slave devices, the present invention is not limited to the configuration. For instance, also the configuration is possible in which all of the projection type display apparatuses $1_{00}$, $1_{10}$, $1_{01}$ and $1_{11}$ are slave devices and the apparatuses are controlled by an external master device.

In the fourth embodiment, the algorithm for adjustment used in the third embodiment is employed, and the output voltage is adjusted by the output voltage level adjusting circuit $12_{km}$ so that the change rate $\alpha_{km}$ is set to 1. However, as described in the third embodiment, a light control unit for controlling brightness of the light source $20_{km}$ can be provided for each projection type display apparatus in place of the output voltage level adjusting circuit $12_{km}$ so that the average change rate $\alpha_{km}$ is set to 1.

Fifth Embodiment

In description of a multiscreen display apparatus according to the fourth embodiment, it is assumed for readers to understand easily that brightness reduced by the over-time change can be recovered (corrected) to the original level. However, when the brightness is reduced substantially, sometimes correction may be impossible. A fifth embodiment of the present invention is provided to solve the problem. Furthermore, configuration of the multiscreen display apparatus according to the fifth embodiment is the same as that in the fourth embodiment, and therefore the details are not described here.

Figure 17:
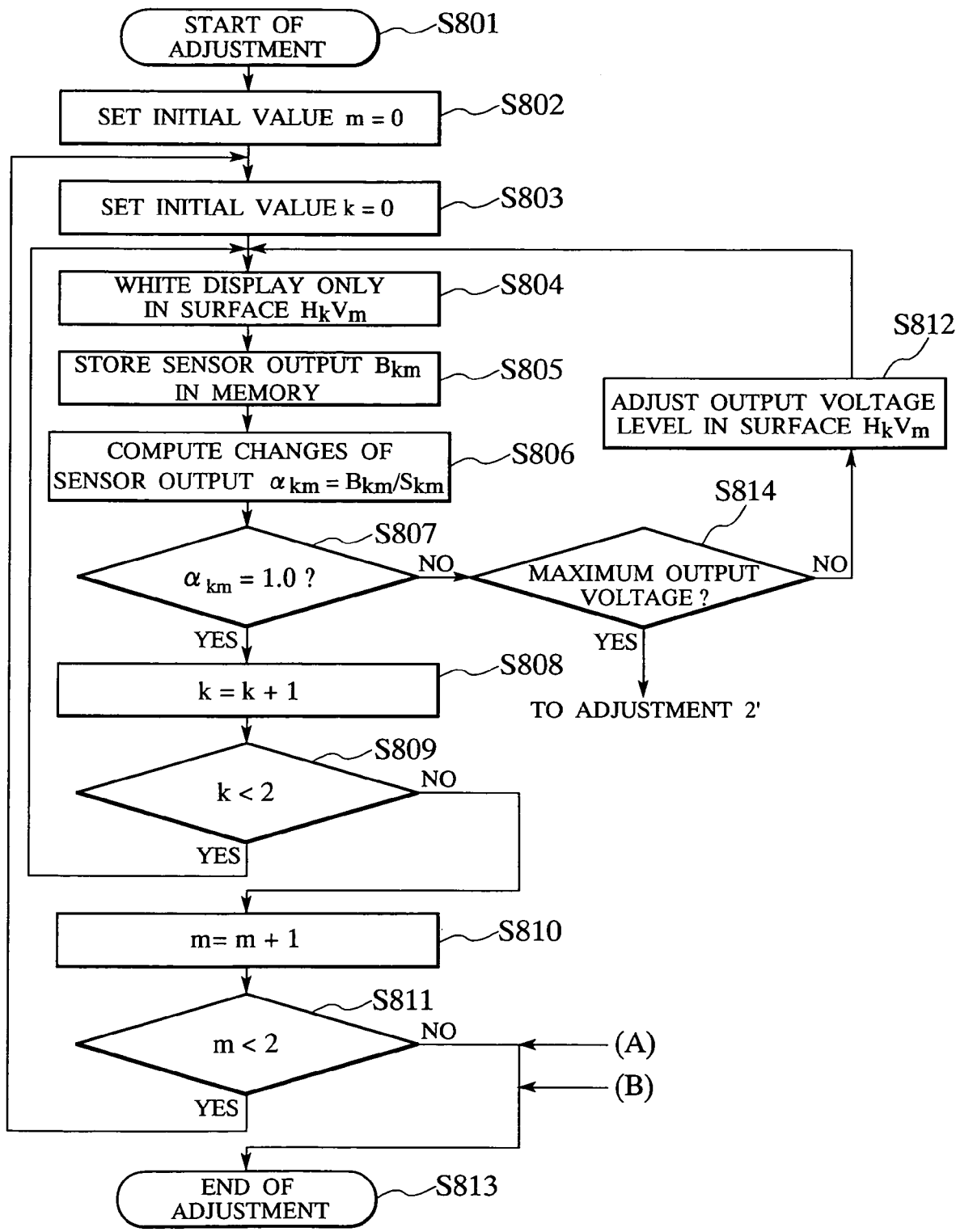
FIG. 17 is a flow chart showing steps of adjustment with a fifth embodiment.
Figure 18:
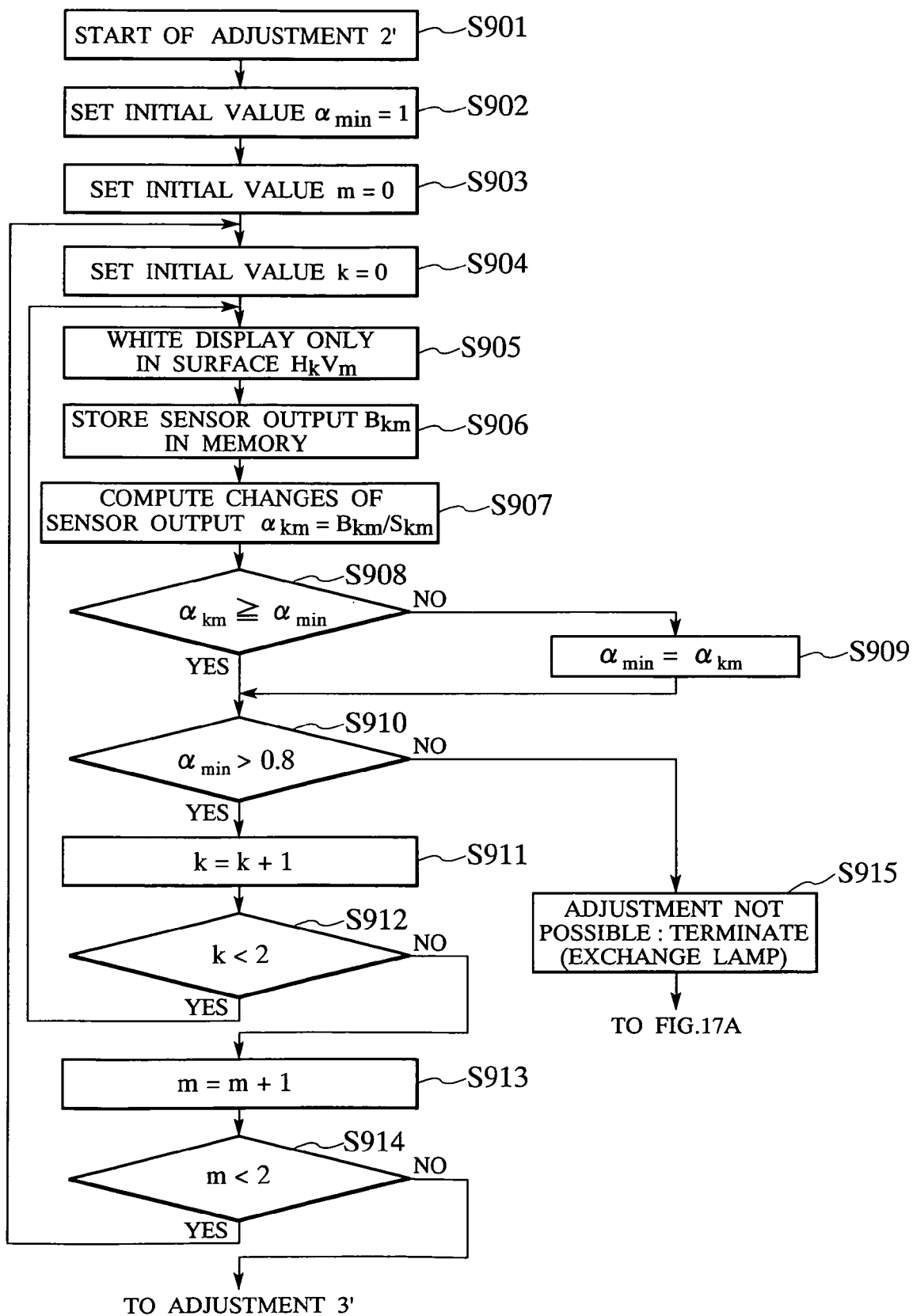
FIG. 18 is a flow chart showing steps of adjustment 2' with the fifth embodiment.

FIG. 17, FIG. 18, and FIG. 18 are flow charts illustrating an adjustment procedure according to the fifth embodiment. In the fifth embodiment, a determination processing step S814 is added to the fourth embodiment shown in FIG. 16. Because processing in S801 to S812 is the same as that described in the fourth embodiment, the description is omitted, and only the processing step S814 and on will be described below.

In S814 shown in FIG. 17, whether an output voltage from the display device driving circuit $13_{km}$ in the projection type display apparatus $1_{km}$ is maximum or not is determined. When the output voltage is not maximum, the output voltage can be raised by the output voltage level adjusting circuit $12_{km}$, and therefore the processing proceeds to S812, where the output voltage is adjusted. When the output voltage is maximum, the processing proceeds to S901 in the adjustment 2' shown in FIG. 18, and the adjustment 2' is started.

The adjustment 2' is performed to compute the smallest (darkest) $\alpha_{km}$ providing the largest change of brightness among the four projection type display apparatuses constituting the multiscreen display apparatus.

When the adjustment 2' is started, the microcomputer 100 of the projection type display apparatus $1_{00}$ in the master device sets the initial value $\alpha_{min}$ to 1 (S902), the initial value m to zero (S903), and initial value k to zero (S904). Then the processing proceeds to S905, and then an instruction for computing the change rate $\alpha_{km}$ is given to the microcomputer $11_{km}$ of the target projection type display apparatus $1_{km}$ (display surface $H_kV_m$). The microcomputer $11_{km}$ of the target projection type display apparatus $1_{km}$ having received the instruction provides white display according to the algorithm for adjustment in the third embodiment. Then the intensity of diffuse reflection $17_{km}$ obtained from the detector $5_{km}$ is detected, and the sensor output value $B_{km}$ is stored in the memory $10_{km}$ (S906). In S907, the microcomputer $11_{km}$ reads out $S_{km}$ and $B_{km}$ from the memory $10_{km}$ to compute the change rate $\alpha_{km}=B_{km}/S_{km}$, and a result of computing is transmitted to the microcomputer $11_{00}$ of the master device. The microcomputer $11_{00}$ of the master device determines whether the $\alpha_{km}$ received in S908 is equal to or larger than $\alpha_{min}$ or not. When a result of determination is NO, the processing proceeds to S909 to adjust $\alpha_{min}$ to $\alpha_{km}$, and then the processing proceeds to S910. When a result of determination is YES, the processing immediately proceeds to S910. In S910, whether $\alpha_{min}$ is larger than the change rate (i.e., for instance, 0.8) at which replacement of the light source $20_{km}$ is required because the image light is too dark or not, is determined. When a result of determination in S910 is NO, an alarm indicating the necessity of exchanging the light source $20_{km}$ is provided (i.e., the display of "Exchange lamp" for the projection type display apparatus $1_{km}$ is provided) to alert the necessity of exchange of the light source. Then the processing proceeds to S813 and the adjustment processing is terminated.

When a result of determination in S910 is YES, the processing proceeds to S911, where the current value is incremented by 1. In S912, whether the additional value is smaller than 1 which is the number of columns or not is determined. When a result of determination in S912 is YES indicating that adjustment for the row $V_m$ has not been completed, the processing returns to S905. The processing steps S905 to S912 are repeated until adjustment for the row $V_m$ is completed in all projection type display apparatuses $1_{km}$ (K: 0, 1). When a result of determination in S912 is NO indicating that adjustment for the row $V_m$ has been completed in all projection type display apparatuses, the current value m is incremented by 1 in S913 for adjustment for the next row. Whether the additional value is smaller than 2 which is the number of rows or not is determined in S914, and when a result of determination in S914 is YES indicating that the adjustment for all rows has not been not completed, the processing returns to S904. Then the processing steps from S904 to S914 are repeated until adjustment for all rows is completed. When a result of determination in S914 is NO indicating that adjustment for all rows has been completed in all of the projection type display apparatuses, the target value $\alpha_{min}$ in has been computed. In this case, the microcomputer $11_{00}$ of the master device starts adjustment 3' in S1001 shown in FIG. 19.

In adjustment 3', the change rate for the projection type display apparatuses constituting the multiscreen display apparatus is set to the $\alpha_{min}$ in set in the adjustment 2'.

Figure 19:
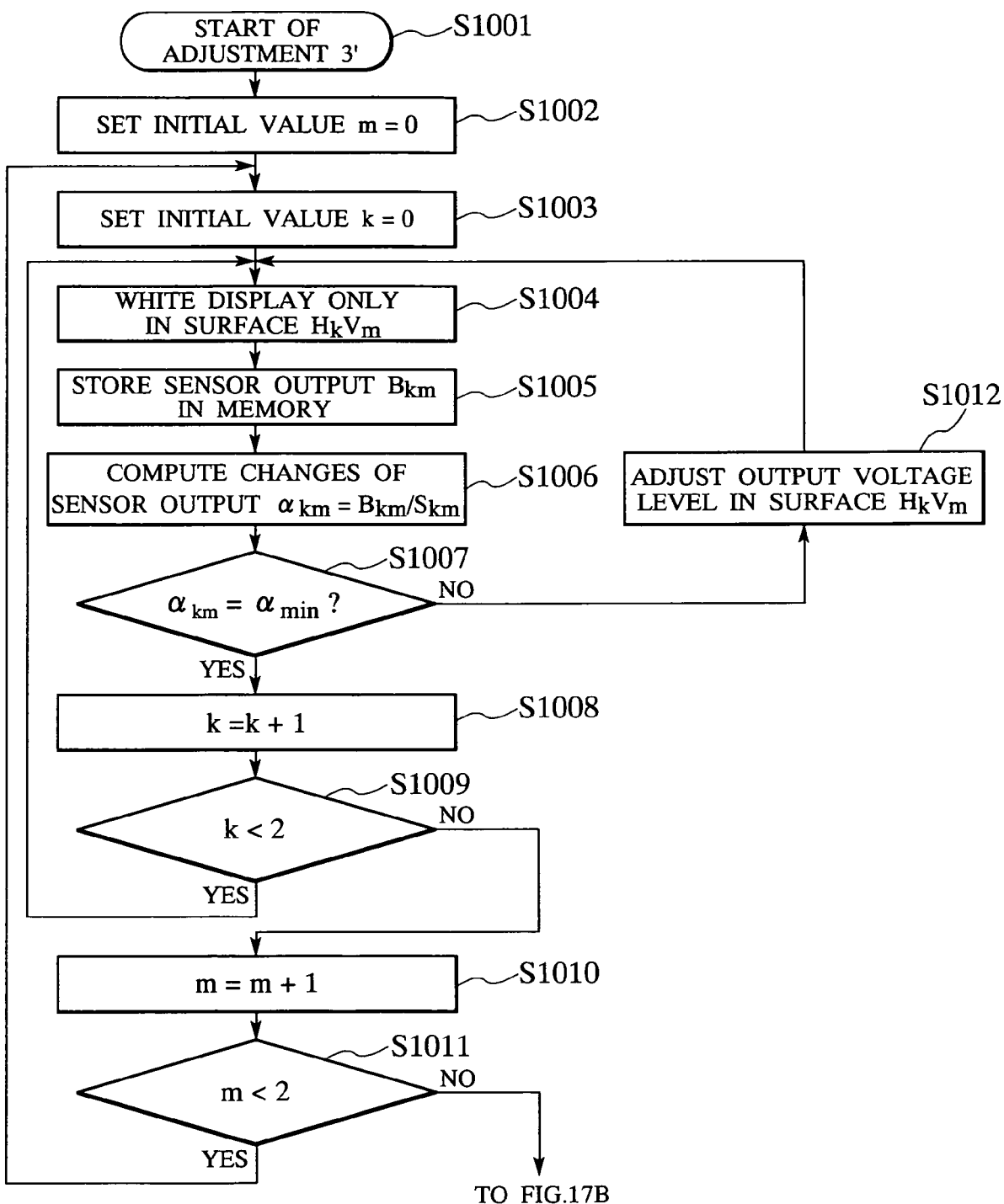
FIG. 19 is a flow chart showing steps of adjustment 3' with the fifth embodiment.

In FIG. 19, when the adjustment 3' is started, the microcomputer $11_{00}$ of the projection type display apparatus $1_{00}$ in the master device at first sets the initial value m to zero (S1002) and the initial value K to zero (S1003). Then the processing proceeds to S1004, where the microcomputer $11_{00}$ sends an instruction for computing the change rate $\alpha_{km}$ to the microcomputer $11_{km}$ of the projection type display apparatus $1_{km}$ (display surface $H_kV_m$), and also sends the data $\alpha_{min}$ computed in the adjustment 2'. The microcomputer $11_{km}$ of the target projection type display apparatus $1_{km}$ having received this instruction stores the data $\alpha_{min}$ in the memory $10_{km}$ and provides white display according to the algorithm for adjustment as described in the third embodiment. Then intensity of the diffuse reflection $17_{km}$ obtained from the detector $5_{km}$ is detected, and the sensor output value $B_{km}$ is stored in the memory $10_{km}$ (S1005). In S1006, the microcomputer $11_{km}$ read out $S_{km}$ and $B_{km}$ from the memory $10_{km}$ and computes the change rate $\alpha_{km}=B_{km}/S_{km}$. Then the microcomputer $11_{km}$ reads out $\alpha_{min}$ from the memory $10_{km}$ in S1007, and determines whether $\alpha_{km}$ is equal to $\alpha_{min}$ or not. When a result of determination is NO, the processing proceeds to S1012, where an output voltage from the display device driving circuit $13_{km}$ is adjusted by the output voltage level adjusting circuit $12_{km}$. Then the loop processing in S1004 to S1007-S1012 is repeated until the change rate $\alpha_{km}$ is equalized to $\alpha_{min}$.

When the change rate $\alpha_{km}$ is equalized to $\alpha_{min}$ in S1007 and adjustment in the projection type display apparatus $1_{km}$ is completed, the microcomputer $11_{km}$ of the projection type display apparatus $1_{km}$ sends information indicating termination of the adjustment to the microcomputer $11_{00}$ of the master device. When the information is received, the microcomputer $11_{00}$ of the master device changes the initial values k and m for all of the projection type display apparatus $1_{km}$ (k: 0, 1, m: 0, 1) in S1008, executes the processing for equalizing the change rate $\alpha_{km}$ to $\alpha_{min}$ (S1008 to S1011). When the setup processing for all of the projection type display apparatuses (adjustment 3') is completed, the microcomputer $11_{00}$ of the master device terminates the adjustment processing in S813.

As described above, in the fifth embodiment, the effects described in the fourth embodiment can be obtained. However, when the brightness reduced due to the over-time change can not be returned (corrected) to the original level, adjustment can be performed so that a change rate of the brightness in each projection type display apparatus constituting the multiscreen display apparatus is equalized. Because of this feature, unevenness in brightness of each projection type display apparatus can be eliminated, and change of an image caused by the over-time change can be reduced. Furthermore, when the brightness (intensity) changes substantially and a value of the change rate (ratio) is small, the necessity of exchange of the lamp is alerted, which facilitates the maintenance.

Sixth Embodiment

In the first to fifth embodiments, the light intensity is detected by a detector, but the present invention is not limited to the configuration. For instance, the so-called color sensor for detecting intensity of each of the R, G, and L light can be used. The sixth embodiment will be described below, and in the sixth embodiment, a color sensor is used as a detector.

Figure 20:
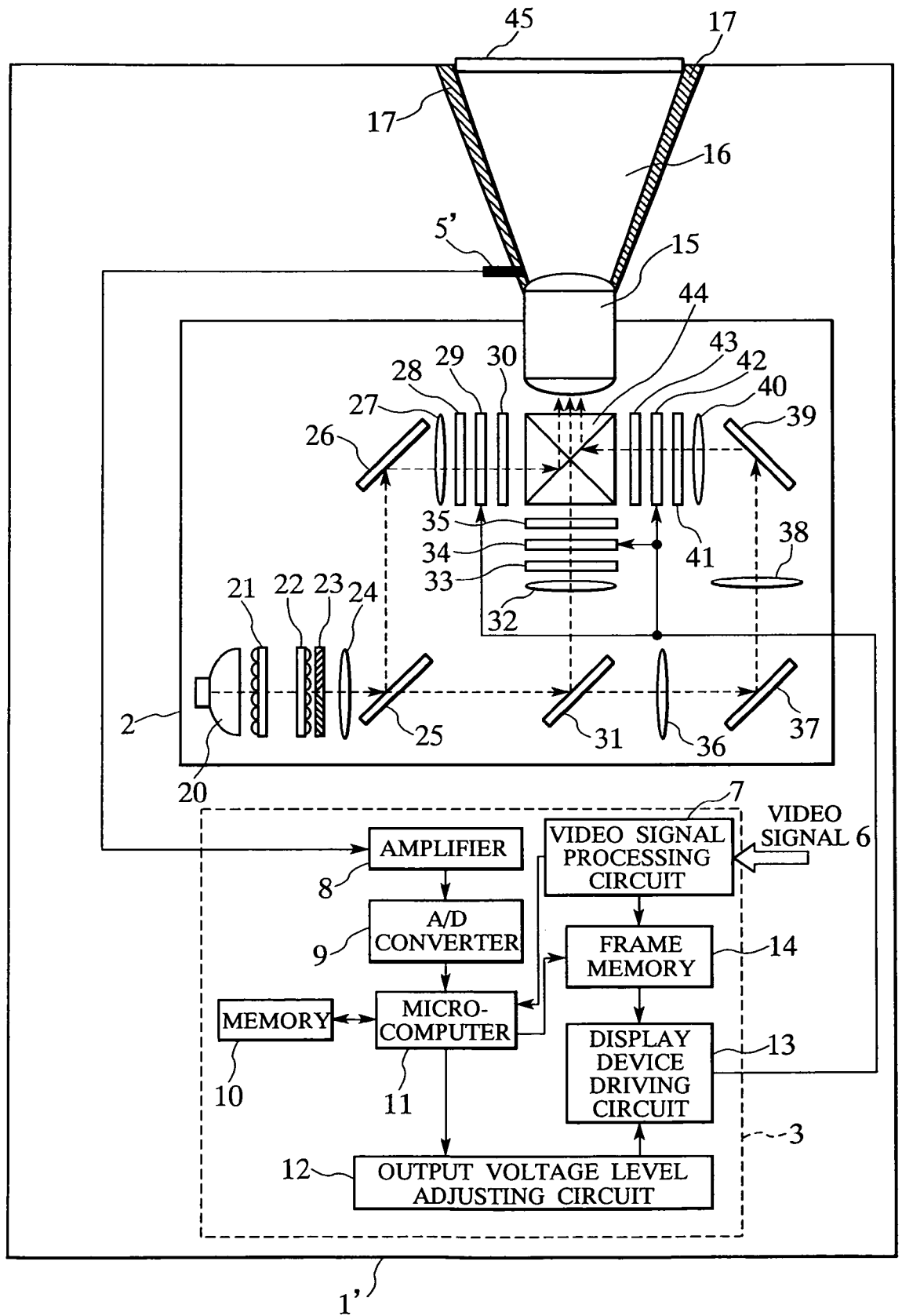
FIG. 20 is a schematic diagram showing a projection-type display apparatus using a color sensor as a detector based on a sixth embodiment.

FIG. 20 is a block diagram schematically showing a projection type display apparatus according to the sixth embodiment of the present invention in which a color sensor is used as a detector. A projection type display apparatus 1' shown in FIG. 20 is different from the projection type display apparatus 1 shown in FIG. 1 in that a color sensor 5' is used in place of the detector 5, and other portions of the configuration are the same as those of the projection type display apparatus 1. The same reference numerals are assigned to the portions having the same functions as those shown in FIG. 1, and detailed description of the portions is omitted here.

Figure 21:
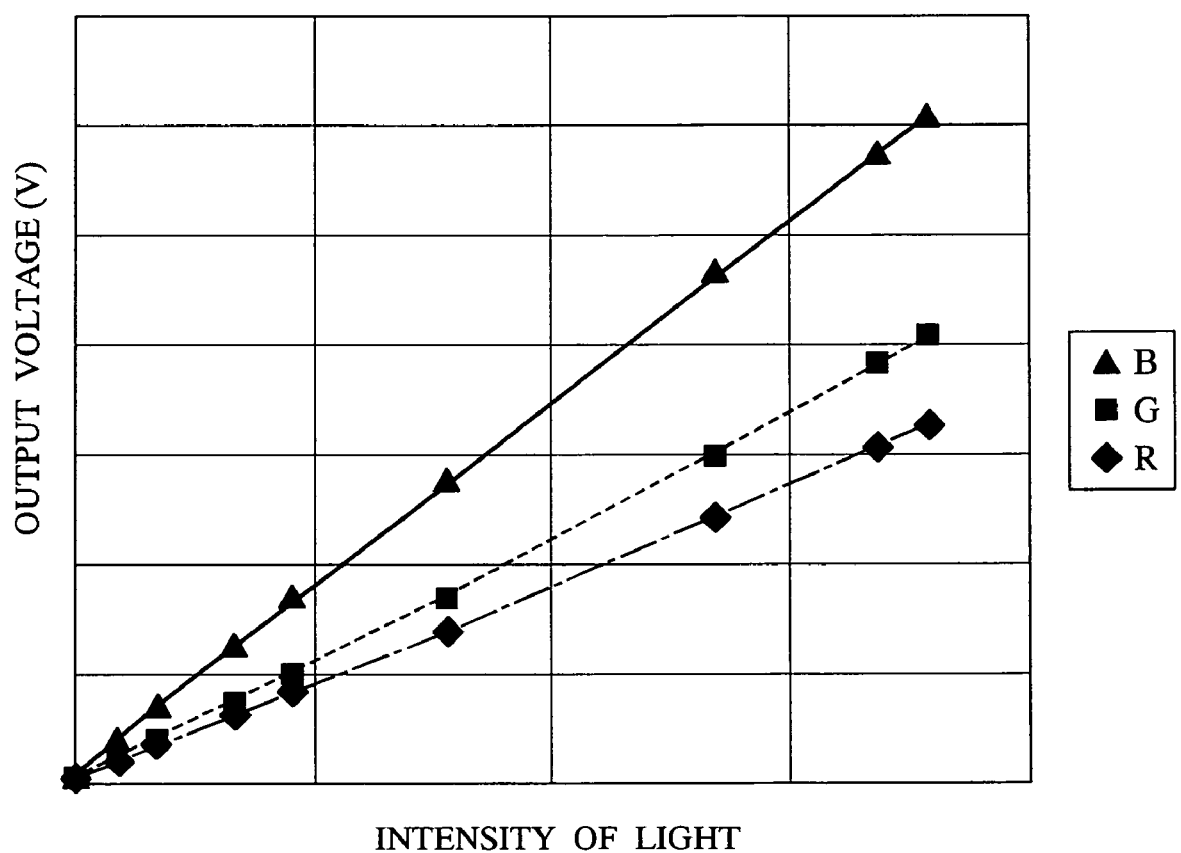
FIG. 21 is a chart showing relation between the image light within the display screen and the diffuse reflection based on the sixth embodiment.

FIG. 21 shows the light intensity characteristics of diffuse reflection for each of R, G, and B. The intensity is obtained by disposing the color sensors 5' in place of the detectors 5 at positions in FIG. 2 and FIG. 3 in the first embodiment and also by changing intensity of imaging light within the display area. Like in the case of measuring intensity of diffuse reflection detected by the detector 5 as shown in FIG. 4, the graph shows that intensity of each of the R, G, B light within the display area and diffuse reflection appearing around the display area are correlated to each other.

In the sixth embodiment, intensity of each of the R, G, and B light is detected, display patterns $P_{ijr}$, $P_{ijg}$, and $P_{ijb}$ are used as the display pattern $P_{ij}$ with a cell $H_iV_j$ only changed from white display to the R, G, or B color display. The display patterns are previously stored in the memory 10.

Acquisition of reference data is performed like in the first embodiment according to the flow chart illustrating the procedure for acquiring reference data shown in FIG. 6. Namely, a display pattern for each color is displayed, and the intensity of the diffuse reflection is acquired with the color sensor 5' for each of R, G, and B. Like in the first embodiment, the acquired reference data $R_{ijr}$ ($R_{00r}$ to $R_{77r}$), $R_{ijg}$ ($R_{00g}$ to $R_{77g}$), and $R_{ijb}$ ($R_{00b}$ to $R_{77b}$) is stored in the memory 10.

Adjustment after the over-time change is performed according to the flow chart illustrating the adjustment procedure shown in FIG. 7. Namely, at first a display pattern for each color read out from the memory 10 is displayed in the cell $H_iV_j$ (i, j: 0 to 7). Then the change rates $\alpha_{ijr}$, $\alpha_{ijg}$, and $\alpha_{ijb}$ are computed based on the sensor outputs from the detected sensor outputs $A_{ijr}$ ($A_{00r}$ to $A_{77r}$) $A_{ijg}$ ($A_{00g}$ to $A_{77g}$), and $A_{ijb}$ ($A_{00b}$ to $A_{77b}$). Then a control voltage for the display device is adjusted by the output voltage level adjusting circuit 12 until $\alpha_{ijr}$, $\alpha_{ijg}$, and $\alpha_{ijb}$ are adjusted to 1.0 respectively. When the change rates $\alpha_{ijr}$, $\alpha_{ijg}$, and $\alpha_{ijb}$ are adjusted to 1.0 respectively, the same processing is performed to the next cell, and thus adjustment for the cell $H_iV_j$ (i, j: 0 to 7) is executed to all of the 64 cells as described above.

As described above, in the sixth embodiment, change of light intensity caused by the over-time change is adjusted for each display pattern and at the same time a control voltage for the display device is adjusted until a change rate is 0 for each of R, G, B color signals. Because of the feature, change in color balance in an image caused by the over-time change can be reduced.

In the first to sixth embodiments described above, a transmission type liquid crystal panel, in which an optical image is formed by changing the transmission factor with a video signal voltage, is used as a display device, but the present invention is not limited to the configuration. For instance, a reflection type liquid crystal panel, in which an optical image is formed by changing the reflection factor with a video signal voltage, can be used as the display device. Any type of display device can advantageously be used in the present invention on the condition that an optical image is formed by changing the transmission factor or the reflection factor with a video signal voltage.

It is needless to say that the present invention can be applied to a display device including minute mirrors each having two reflection angles of ON reflection angle and OFF reflection angle and forming an optical image by switching the reflection angle from time to time.

What is claimed is:

1. A projection-type display apparatus comprising:
   a light source;
   a display device that forms an optical image by modulating light from the light source based on a driving voltage;
   a projection lens that enlarges the optical image and projects light from the light source on the display device;
   a detector that detects the light projected from the projection lens, and;
   a control circuit that controls the driving voltage based on the light detected by the detector;
   wherein the detector includes a photo acceptance section arranged to face an outgoing side of the projection lens, and the detector is disposed in the path of the light projected by the lens, outside of an effective area of light projected on a screen which receives the projected light in proximity to an outer edge of a light flux projected from the projection lens,
   wherein the detector is not located on the screen.

2. A projection-type display apparatus comprising:
   a light source;
   a display device that forms an optical image by modulating a light from the light source based on a driving voltage;
   a projection lens that enlarges the optical image and projects the light from the light source on the display device;
   a screen on which the light from the projection lens is projected;
   a detector that detects the projected light from the projection lens, and;
   a control circuit that controls the driving voltage based on the light detected by the detector;
   wherein the detector includes a photo acceptance section arranged to face an outgoing side of the projection lens, disposed in the path of the light projected by the lens, outside of an effective area of light projected on a screen which receives the projected light and the detector detects light projected outside of an effective area on the screen among portions of the light from the projection lens, wherein the detector is not located on the screen.

3. The projection-type display apparatus according to claim 1, wherein the detector detects diffuse reflection from the projection lens.

4. The projection-type display apparatus according to claim 3, wherein the control circuit is able to control brightness of an image for each area of the display device by controlling the driving voltage for each area.

5. The projection-type display apparatus according to claim 4, wherein the control circuit further comprises a memory that records a plurality of reference data sets associated with a plurality of display patterns respectively, and a comparison section that compares the reference data sets stored in the memory with a light intensity detected by the detector when the plurality of the display patterns are displayed, for each of the plurality of the display patterns, the control circuits controlling the driving voltage for each area on the display device based on the comparison performed by the comparison section.

6. The projection-type display apparatus according to claim 4, wherein, in the case where the driving voltage cannot be controlled based on a predetermined transition rate when the driving voltage is controlled for each area on the display device, the driving voltage is controlled based on a minimum value of a light intensity detected by the detector.

7. The projection-type display apparatus according to claim 3, wherein the detector is able to detect a light intensity for each color of RGB and adapted to control the driving voltage of the display device for each color.

8. A projection-type display apparatus comprising:
a light source;
a display device that forms an optical image by modulating a light from the light source based on a driving voltage;
a projection lens that enlarges the optical image and projects the light from the light source on the display device;
a screen on which the light from the light source is projected by the projection lens;
a detector that detects the light projected from the projection lens, and;
a control circuit that controls a brightness of the light source based on the light detected by the detector;
wherein the detector includes a photo acceptance section arranged to face an outgoing side of the projection lens, disposed in the path of the light projected by the lens, outside of an effective area of light projected on a screen which receives the projected light and the detector detects a diffuse reflection from the projection lens, wherein the detector is not located on the screen.

9. The projection-type display apparatus according to claim 8, wherein the detector is disposed in proximity to an outer edge of light flux projected from the projection lens and detects light projected to an area outside of an effective area on the screen among portions of light projected from the projection lens.

10. The projection-type display apparatus according to claim 8, wherein the control circuit further comprises a memory that records a plurality of reference data sets associated with a plurality of display patterns, and a comparison section that compares the reference data sets stored in the memory with the light intensity detected by the detector when the plurality of the display patterns are displayed, for each of the plurality of the display patterns, and controls the driving voltage applied to the light source based on the comparison performed by the comparison section.

11. A multiscreen display apparatus combined with a plurality of projection-type display apparatuses, each projection-type display apparatus including:
a light source;
a display device that forms an optical image by modulating a light from the light source based on a driving voltage;
a projection lens that enlarges the optical image and projects the light from the light source on the display device;
a screen on which the light from the light source is projected by the projection lens;
a detector that detects the light projected from the projection lens, and;
a control circuit that controls the driving voltage so as to compensate for a difference of a brightness among the plurality of the projection-type display apparatuses based on the light detected by the detector;
wherein the detector includes a photo acceptance section arranged to face an outgoing side of the projection lens, disposed in the path of the light projected by the lens, outside of an effective area of light projected on a screen which receives the projected light and the detector detects diffuse reflection from the projection lens, wherein the detector is not located on the screen.

12. The multiscreen display apparatus according to claim 11, wherein the control circuit compensates the difference of the brightness among the plurality of the projection-type display apparatuses by controlling at least one of the of brightness of the light source and the driving voltage for the display device.

13. The multiscreen display apparatus according to claim 11, wherein the control circuit controls voltage based on a minimum value of the light intensity data detected by the detector when it is not possible to control the brightness of the light source or the driving voltage for the display device at a predetermined transition rate.

* * * * *